US007518635B2

(12) United States Patent
Kawahara et al.

(10) Patent No.: US 7,518,635 B2
(45) Date of Patent: *Apr. 14, 2009

(54) METHOD AND APPARATUS FOR IMAGE SENSING

(75) Inventors: Hideo Kawahara, Hatogaya (JP); Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

This patent is subject to a terminal disclaimer.

(21) Appl. No.: 11/081,775

(22) Filed: Mar. 17, 2005

(65) Prior Publication Data

US 2005/0157181 A1 Jul. 21, 2005

Related U.S. Application Data

(62) Division of application No. 09/255,549, filed on Feb. 22, 1999, now Pat. No. 6,963,361.

(30) Foreign Application Priority Data

Feb. 24, 1998 (JP) ................................. 10-057330
Mar. 20, 1998 (JP) ................................. 10-092664

(51) Int. Cl.
*H04N 5/228* (2006.01)
(52) U.S. Cl. ................................. 348/208.6; 348/208.99
(58) Field of Classification Search ............ 348/208.99, 348/208.1, 208.2–208.4
See application file for complete search history.

(56) References Cited

U.S. PATENT DOCUMENTS 5,060,074 A * 10/1991 Kinugasa et al. ......... 348/208.6
5,249,037 A * 9/1993 Sugiyama et al. ........... 348/452
5,386,264 A * 1/1995 Sekine et al. ................ 396/55
5,497,191 A * 3/1996 Yoo et al. ................ 348/208.6
5,502,483 A * 3/1996 Takase et al. .......... 348/208.13
5,502,484 A * 3/1996 Okada ...................... 348/208.6
5,526,045 A * 6/1996 Oshima et al. ........... 348/208.5
5,717,611 A * 2/1998 Terui et al. .................. 702/150
5,926,212 A * 7/1999 Kondo ................... 348/207.99
6,122,004 A * 9/2000 Hwang .................. 348/208.13
6,211,910 B1 * 4/2001 Kino et al. ............. 348/208.99
6,625,166 B2 9/2003 Tsukamoto et al.

FOREIGN PATENT DOCUMENTS

| JP | 03-132173 | 6/1991 |
|---|---|---|
| JP | 04-196775 | 7/1992 |
| JP | 06-197257 | 7/1994 |
| JP | 07-177426 | 7/1995 |
| JP | 07-240870 | 8/1995 |
| JP | 08-154212 | 6/1996 |
| JP | 09-116800 | 5/1997 |
| JP | 09-289612 | 11/1997 |

* cited by examiner

*Primary Examiner*—David L Ometz
*Assistant Examiner*—Pritham Prabhakher
(74) *Attorney, Agent, or Firm*—Locke Lord Bissell & Liddell LLP

(57) ABSTRACT

A correction variable is calculated based on vibration data of an image sensing apparatus. Based on the calculation result, timing of reading image signals from an image sensing device is controlled. The read image signals are delayed by predetermined time, the read image signals and the delayed image signals are added at a predetermined addition ratio based on the calculation result of the correction variable calculator. In still image sensing, the above addition operation is not performed.

12 Claims, 22 Drawing Sheets

PRIOR ART

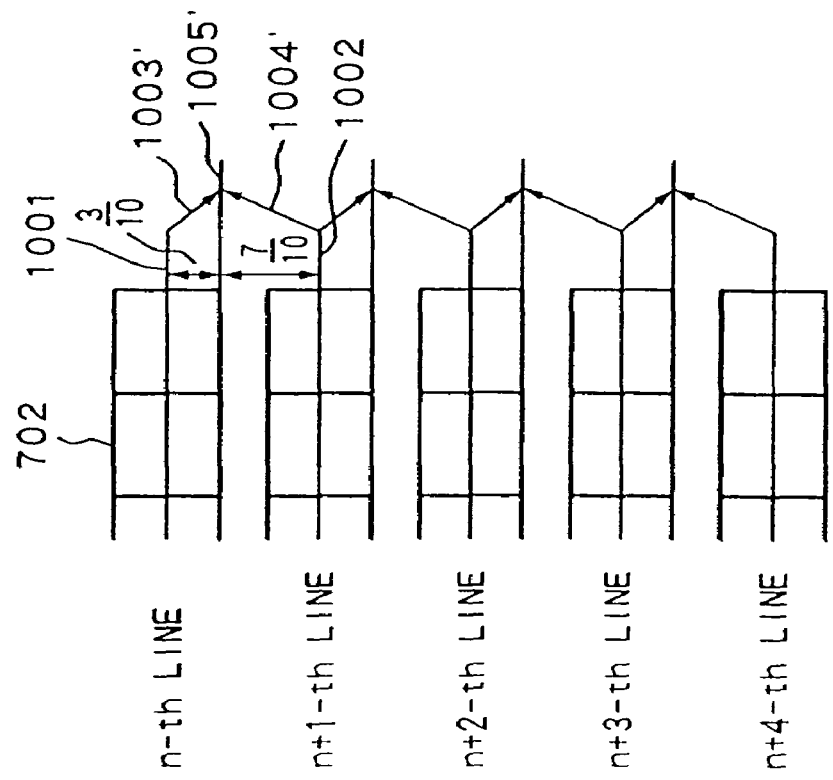
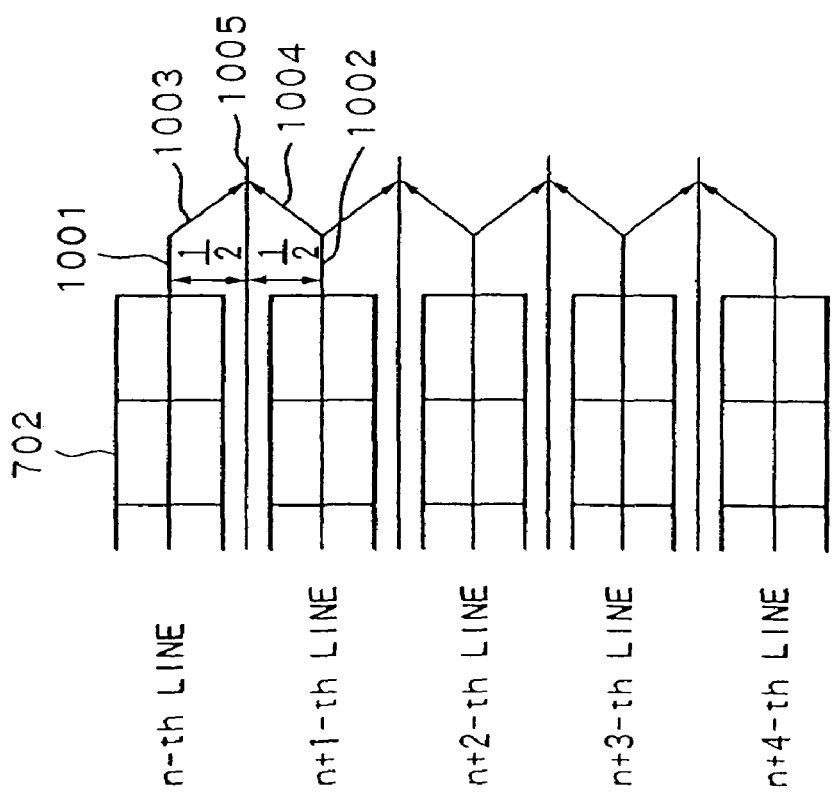

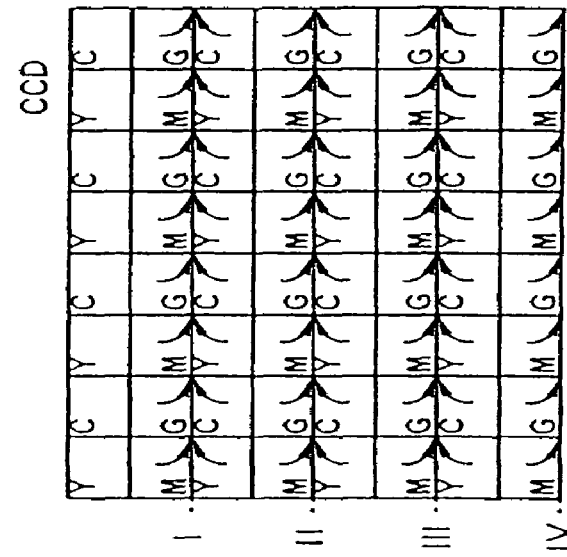
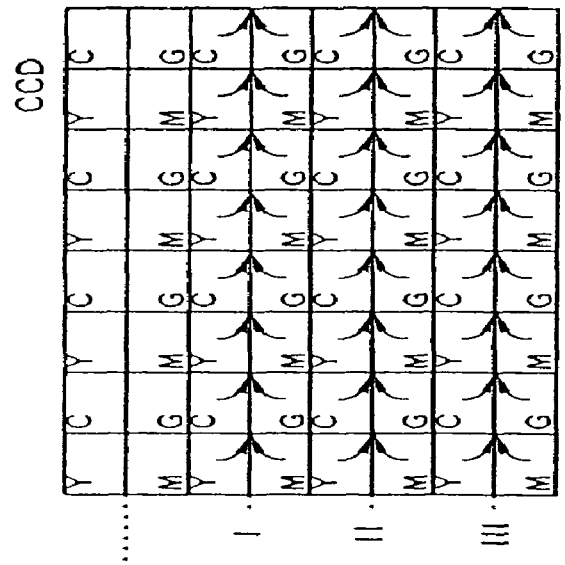
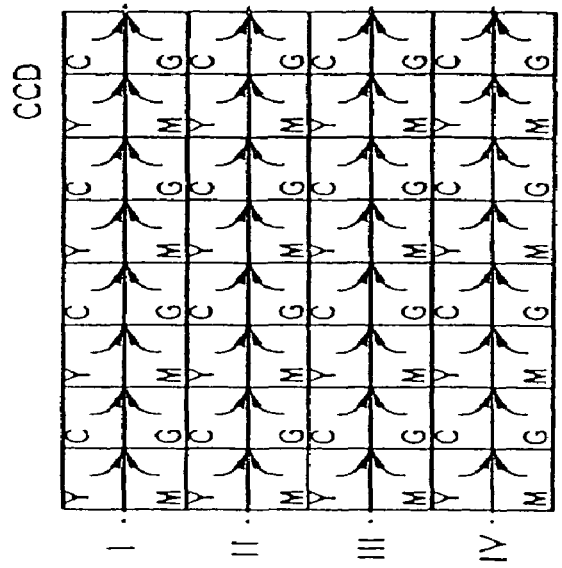

METHOD AND APPARATUS FOR IMAGE SENSING

CROSS REFERENCE TO A RELATED APPLICATION

This application for letters patent is a divisional application and hereby incorporates by reference the parent application, U.S. patent application Ser. No. 09/255,549, filed on Feb. 22, 1999, now U.S. Pat. No. 6,963,361 entitled "Method and Apparatus for Image Sensing".

BACKGROUND OF THE INVENTION

The present invention relates to an image sensing apparatus comprising an electronic anti-vibration system which performs vibration correction by electrically extracting a sensed image based on vibration data of the image sensing apparatus main body. Particularly, the present invention relates to an image sensing method and apparatus capable of sensing a moving image and a still image, and a storage medium storing control programs for controlling the image sensing apparatus.

Conventional image sensing apparatuses such as a video camera or the like have achieved automatic functions and multi-functions in various aspects, e.g., automatic exposure (AE), automatic focus (AF) and so forth. By virtue of this, high quality image sensing is possible.

Furthermore, as the sizes of image sensing apparatuses become smaller and magnifications of optical systems become higher, vibration of the image sensing apparatus causes deteriorated sensed image quality. To compensate for such influence of vibration of the image sensing apparatus, various image sensing apparatuses having a function for correcting vibration have been proposed.

FIG. 1 is a block diagram showing a construction of a conventional image sensing apparatus having a vibration correction function.

The image sensing apparatus having the vibration correction function shown in FIG. 1 comprises an image sensing unit 401, a vibration correction section 402, a signal processor 403, a recording section 404, a vibration detector 405, a DC cut filter 406, an amplifier 407, a correction variable calculator 408, a read-out controller 409, and a timing generator 410.

The image sensing unit 401 comprises a lens 401a, and an image sensing device 401b such as a CCD or the like.

The vibration correction section 402 is provided to correct image signals, obtained by the image sensing device 401b, in order to reduce vibration components of a moving image influenced by unsteady hands or the like. The vibration correction section 402 comprises a first delay section 402a serving as delay means for one pixel, a first adder 402b, a second delay section 402c serving as delay means for one image line, and a second adder 402d.

The signal processor 403 converts electric signals, where vibration components are reduced by the vibration correction section 402, to standard video signals such as NTSC signals or the like. The recorder 404, comprising a video tape recorder or the like, records the standard video signals converted by the signal processor 403 as image signals.

The vibration detector 405 comprises an angular velocity sensor such as a vibration gyro sensor or the like and is installed in the image sensing apparatus main body.

The DC cut filter 406 cuts off the DC components of the angular velocity signal, outputted by the vibration detector 405, and passes AC components only, i.e., vibration components. The DC cut filter 406 may employ a high-pass filter (hereinafter referred to as HPF) for cutting off signals of a predetermined band.

The amplifier 407 amplifies the angular velocity signal outputted by the DC cut filter 406 to an appropriate level.

The correction variable calculator 408 comprises, e.g., a microcomputer or the like, which includes an A/D converter 408a, high-pass filter (HPF) 408b, integrator 408c, and pan/tilt determination section 408d.

The A/D converter 408a converts the angular velocity signal outputted by the amplifier 407 to digital signal.

The high-pass filter 408b, having a variable cut-off frequency, cuts off low frequency components of the digital signal outputted by the A/D converter 408a.

The integrator 408c outputs an angle displacement signal by integrating the signals (angular velocity signal) outputted by the high-pass filter 408b, and has the function to vary characteristics in an arbitrary frequency band.

The pan/tilt determination section 408d determines panning or tilting based on the angular velocity signal, the angular velocity signal outputted by the integrator 408c, and an integrated signal, i.e., angle displacement signal, on which integration process has been performed on the angular velocity signal. The pan/tilt determination section 408d performs panning control, which will be described later, in accordance with the levels of the angular velocity signal and angle displacement signal.

The angle displacement signal obtained by the correction variable calculator 408 serves as a correction target value in the control described later.

The read-out controller 409 shifts a read-out start position of the image sensing device 401b in accordance with the vibration correction target value signal, and controls operation timing of the first delay 402a and the second delay 402c as well as an addition ratio of the first adder 402b and the second adder 402d.

The timing generator 410 generates driving pulses for the image sensing device 401b, the first delay 402a, and the second delay 402c, based on the control data of the read-out controller 409. Driving pulses are generated for the image sensing device 401b according to the storage and read operation of the image sensing device 401b. For the first delay 402a and the second delay 402c, driving pulses which serve as a reference for delaying operation, and whose phases are coherent with the driving pulses of the image sensing device 401b, are generated.

The vibration correction comprises the vibration detector 405, DC cut filter 406, amplifier 407, correction variable calculator 408, read-out controller 409, and timing generator 410.

Next, operation of the pan/tilt determination section 408d of the correction variable calculator 408 will be described in detail.

The pan/tilt determination section 408d determines an angular velocity signal from the A/D converter 408a and an angle displacement signal from the integrator 408c. If the angle displacement signal, which is obtained by integrating the angular velocity signal, is larger than the predetermined threshold value, the section 408d determines that panning/tilting operation is being performed, regardless of whether or not the angular velocity is larger or smaller than a predetermined threshold value. In such case, the low cut-off frequency of the high-pass filter 408b is shifted higher to change the characteristics so that the vibration correction system does not respond to low frequencies. Further, in order to gradually shift a correction position of the image correction means to the center of the correction range, control is performed (hereinafter referred to as panning control) such that a time constant serving as an integration characteristic of the integrator 408c is reduced, so that an integral value by the integrator 408c becomes to a reference value (a value obtained if vibration is not detected).

Note that during the above operation, the angular velocity signals and angle displacement signals continue to be detected. When the panning or tilting is completed, the low cut-off frequency is reduced to expand the vibration correction range, then the panning control ends.

The panning determination operation will be described with reference to the flowchart in FIG. 2.

First in step S501, the A/D converter 408a converts (A/D conversion) an angular velocity signal amplified by the amplifier 407, to a digital value which can be operable by the correction variable calculator 408. Next in step S502, the high-pass filter 408b operates using the cut-off frequency value prepared in the previous step. Then in step S503, the integrator 408c executes an integration calculation using the time constant value prepared in the previous step. In step S504, the integration result obtained in step S503, i.e., an angle displacement signal, is converted from a digital value to an analogue value then outputted.

In step S505, it is determined whether or not the angular velocity signal is equal to or larger than a predetermined threshold value. If the angular velocity signal is equal to or larger than the predetermined threshold value, determination is made that a panning/tilting operation is being performed. Then in step S506, the cut-off frequency value $f_c$ used for the operation of the high-pass filter 408b is increased from the current value so that the signal in low frequency bands is attenuated in power. Next in step S507, the time constant value used in the integration is reduced from the current value by a predetermined value so that the angle displacement output becomes close to the reference value. Then, the control operation ends.

Meanwhile, if the angular velocity signal is not equal to or larger than the predetermined threshold value in step S505, it is determined in step S508 whether or not the integrated value is equal to or larger than a predetermined threshold value. If the integrated value is equal to or larger than the predetermined threshold value, determination is made that panning or tilting operation is being performed, and the control proceeds to step S506. Meanwhile, if the integrated value is not equal to or larger than the predetermined threshold value in step S508, determination is made that the camera is in a normal control state or panning/tilting operation has been completed. Then, the control proceeds to step S509.

In step S509, the cut-off frequency value used in operation of the high-pass filter 408b is reduced from the current value by a predetermined value so that the signal power in low frequency signals is more decreased. Next in step S510, the time constant value used in integration is increased from the current value by a predetermined value so that the integration are more effective. Then, the control operation ends.

By the above described control, the overflow of integration value exceeding a correction target value is prevented. As a result, the correction target value is kept stationary, and a stable anti-vibration control is achieved.

Next, the correction means in the above-described conventional example will be briefly described with reference to FIG. 3.

Referring to FIG. 3, reference numeral 601 denotes an entire image sensing area of the image sensing device 401b; 602, an extraction frame set in the entire image sensing area 601, where an image signal is actually converted to standard video signals and outputted; and 603, an object sensed by the image sensing device.

Standard video signal in this stage is seen as an image indicated as reference numeral 604. More specifically, reference numeral 604 denotes an image area on a monitor where the video signal is reproduced, and 603' denotes the object reproduced in the image area 604 of the monitor. By extracting an image signal from a sensed image as will be described later, the periphery is removed from the entire image sensing area 601 and the remaining portion, that is an extracted image is outputted as standard video signals. By this, the image area 604 is reproduced on the monitor.

FIG. 3 shows a case where an operator, who performs image sensing of the object 603, shifts the image sensing apparatus in a lower left direction indicated by arrows 605, 605', and 605".

In this state, if an image is extracted by using an extraction frame 602' which corresponds to the extraction frame 602, the obtained video signal would represent the object 603, which is shifted by the amount of vector indicated by the arrow 606. It is possible to obtain the image 604 if the extraction position is corrected and moved from the extraction frame 602' to the extraction frame 602", using an image displacement 607 obtained based on a vibration amount of the image sensing apparatus, i.e., vibration correction target value. By employing such principle, image vibration correction is realized.

Next, extraction of an image sensing area for correction will be described with reference to FIG. 4.

In FIG. 4, reference numeral 701 denotes the entire image sensing device; and 702, pixels constructing the entire image sensing device 701, each serving as a photoelectric converter. Based on electric driving pulses generated by a timing generator (not shown), charge storage and read-out controls are performed pixel by pixel. Reference numerals 703 and 704 are extraction frames similar to the extraction frame 602 shown in FIG. 3. This will be explained for a case where video signals are extracted with, e.g., the extraction frame 703.

First, starting from the pixel "S", photoelectrically converted charges are read in the sequence of the arrow 706. The reading operation starts in concurrence with the synchronization period of output video signals. During the synchronization period, reading is performed at a faster transfer rate than the normal reading rate until the reading-out reaches the pixel preceding the pixel "A" by one pixel.

After the synchronization period, charges for a real image period are read starting from the pixel "A" to the pixel "F" at the normal reading rate, as a line of image data in video signals.

During the horizontal synchronization period, charges of pixels are read from the pixel "F" to the pixel before the pixel "G" at a faster transfer rate than the normal reading rate, preparing for reading the next image period. Starting from the pixel "G", reading is performed in a similar manner to the reading from the pixel "A" to the pixel "F".

By controlling the reading operation as described above, for instance, the central part of the image sensing device 401b can be selectively extracted from the entire image sensing area 601 of the image sensing device 401b, and video signals can be obtained.

Described next with reference to FIG. 4 is moving the extraction position, necessary in a case where the image sensing surface is shifted due to vibration on the image sensing apparatus as described in FIG. 3.

In a case where the movement of the object (vibration of the image sensing apparatus), which is equivalent to the arrow 705, is detected on the image sensing device 401b, the extraction frame 703 is changed to the extraction frame 704 so that an image without any object movement is obtained.

In order to change the extraction position, the aforementioned read-out start position is changed from the pixel "A" to the pixel "B". By this change, it is possible to selectively extract a partial image from the entire image sensing area 601 of the image sensing device 401b, similar to the case where reading starts from the pixel "A".

More specifically, photoelectrically converted charges are read from the pixel "S" in the sequence of the arrow 706, as similar to the case of reading the extraction frame 703. The reading operation starts in concurrence with the synchronization period of output video signals. During the synchronization period, reading is performed at a faster transfer rate than the normal reading rate until the reading reaches the pixel one-pixel prior to the pixel "B". Then, in the real image period, reading starts from the pixel "B".

As described above, a partial image sensing area, which is the periphery of the image sensing device 401b, is read in advance for the amount corresponding to vibration correction data during the synchronization signal period which does not appear in the real image period, and the part of the image sensing device 401b is selectively read out based on the vibration data. By this, it is possible to obtain video signals from which displacement caused by vibration on the image sensing apparatus is removed.

Next, pixel shifting operation by the first delay 402a, second delay 402c, first adder 402b, and second adder 402d will be described in detail with reference to FIG. 5.

FIG. 5 is a block diagram showing a construction of an image sensing apparatus for performing finer image correction by extracting an image from the image sensing device 401b. Components shown in FIG. 5, which are identical to that of the above-described conventional example in FIG. 1, have the same reference numerals.

Referring to FIG. 5, the first adder 402b comprises a first multiplier 801, a second multiplier 802, an adder 803, and addition controller 804. The second adder 402d comprises a first multiplier 805, a second multiplier 806, an adder 807, and addition controller 808.

The image extraction, as described with reference to FIG. 4 can only be performed in each unit pixel 702 of the image sensing device 401b. Therefore, the correction could not be made for a shift less than one pixel pitch. Therefore, the first delay 402a, second delay 402c, first adder 402b, and second adder 402d perform a fine pixel shifting which accompanies a correction calculation for an amount less than one pixel unit.

Referring to FIG. 5, reference numeral 809 denotes an input terminal for inputting a sensed image signal obtained by the image sensing device 401b. While the sensed image signal is inputted to the second multiplier 802 of the first adder 402b, the signal is inputted to the first multiplier 801 through the first delay 402a constructed by a CCD or the like. After the first multiplier 801 and the second multiplier 802 multiply the respective image signal by a predetermined multiplier, addition is executed by the adder 803. As a result, a horizontal pixel-shifting correction has been performed on the sensed image signal.

The sensed image signal, on which horizontal pixel-shifting correction has been performed, is inputted to the second multiplier 806 of the second adder 402d, and to the first multiplier 805 through the second delay 402c, which is constructed by a CCD or the like. The first multiplier 805 and the second multiplier 806 multiply the signals by predetermined multipliers. The adder 807 adds the outputs of the multipliers 805 and 806. Thus, the sensed image signal on which horizontal and vertical pixel-shifting correction has been performed is obtained. The image signals are encoded to video signals by the signal processor 403 in the next step.

The read-out controller 409 controls the timing of driving pulses generated by the timing generator 410 for performing image extraction control of the image sensing device 401b based on the correction target value signal which corresponds to vibration of the image sensing apparatus, which is generated by the correction variable calculator 408 shown in FIG. 1. Meanwhile, the read-out controller 409 controls the addition controller 804 of the first adder 402b and the addition controller 808 of the second adder 402d so as to perform addition operation at an appropriate addition ratio.

This addition operation will now be described in detail with reference to FIGS. 6A, 6B, 7A and 7B.

FIGS. 6A and 6B are explanatory views showing the process of the first delay 402a and the first adder 402b in unit of the pixels 702 of the image sensing device 401b. The pixels 702 of the image sensing device 401b are arranged in a regular order in the vertical and horizontal directions on the surface of the image sensing device 401b as shown in FIG. 4. FIGS. 6A and 6B only show the pixels arranged in the horizontal direction for explanatory purpose.

First, addition operation performed in pixel units shown in FIG. 6A is described.

A horizontal center position of the n-th pixel of the pixels 702 of the image sensing device 401b is referred to as a horizontal pixel center 901. Similarly, a horizontal center position of the (n+1)th pixel of the pixels 702 is referred to as a horizontal pixel center 902. FIG. 6A graphically shows a method of calculating an imaginary center of the n-th pixel and the (n+1)th pixel. The n-th pixel value which is multiplied by ½, denoted by numeral 903, the (n+1)th pixel value which is multiplied by ½, denoted by 904, are added, thereby obtaining a pixel value at the imaginary center 905 of the n-th pixel and (n+1)th pixel. Similarly, a value in which the (n+1)th pixel is multiplied by ½ is added to a value in which the (n+2)th pixel is multiplied by ½, thereby obtaining a pixel value at the imaginary center of the (n+1)th pixel and the (n+2)th pixel.

Next, another addition operation shown in FIG. 6B will be described. FIG. 6B adopts a different addition ratio from that of FIG. 6A, showing a case of executing an addition with a ratio of 7/10 to 3/10.

In FIG. 6B, as similar to FIG. 6A, the horizontal center position of the n-th pixel of the pixels 702 of the image sensing device 401b is defined as a horizontal pixel center 901, and the horizontal center position of the (n+1)th pixel of the pixels 702 of the image sensing device 401b is defined as a horizontal pixel center 902. In order to obtain an image having 7/10 of the n-th pixel value and 3/10 of the (n+1)th pixel value, a pixel value 903' in which the n-th pixel is multiplied by 7/10 is added to a value 904' in which the (n+1)th pixel is multiplied by 3/10, thereby obtaining an image 905' having 7/10 of the n-th pixel and 3/10 of the (n+1)th pixel. Similarly, by adding a value in which the (n+1)th pixel is multiplied by 7/10 to a value in which the (n+2)th pixel is multiplied by 3/10, it is possible to obtain an pixel having 7/10 of the (n+1)th pixel and 3/10 of the (n+2)th pixel.

As described above, by adjusting the addition ratio of adding the n-th pixel and (n+1)th pixel, it is possible to obtain pixel data for an arbitrary position of a pixel in the horizontal direction. Note that assuming that an n-th pixel value is generally multiplied by k, the addition ratio is obtained by multiplying an (n+1)-th pixel value by (1−K) (where, $0 \leq K \leq 1$). Where the multiplication ratio is set to 1:0 or 0:1, addition is not performed. Then, the normal read-out operation is performed.

FIGS. 7A and 7B are explanatory views showing the process of the second delay 402c and the second adder 402d in the horizontal line units of the image sensing device 401b.

First, addition operation performed in horizontal line units shown in FIG. 7A will be described. The horizontal line is constructed by a horizontal array of pixels of the image sensing device 401b. Vertical center position of the n-th line is referred to as a vertical pixel center 1001. Similarly, the vertical center position of the (n+1)th line is referred to as a vertical pixel center 1002.

FIG. 7A graphically shows a method of calculating a pixel value at the center positioned between the n-th line and the (n+1)th line. A value 1003 in which the n-th line is multiplied by ½ is added to a value 1004 in which the (n+1)th line is multiplied by ½, thereby obtaining a line 1005. Similarly, a value in which the (n+1)th line is multiplied by ½ is added to a value in which the (n+2)th line is multiplied by ½, thereby obtaining the center image of the (n+1)th line and (n+2)th line.

Next, addition operation performed in horizontal line units shown in FIG. 7B will be described. FIG. 7B adopts a different addition ratio from that of FIG. 7A, showing a case of executing addition with a ratio of 7/10 to 3/10.

In FIG. 7B, similar to FIG. 7A, the vertical center position of the n-th line of the pixels 702 of the image sensing device 401b is referred to as a vertical pixel center 1001, and the vertical center position of the (n+1)th line is referred to as the vertical pixel center 1002. In order to obtain an image having 7/10 of the n-th line and 3/10 of the (n+1)th line, a value 1003' in which the n-th line is multiplied by 7/10 is added to a value 1004' in which the (n+1)th line is multiplied by 3/10, thereby obtaining a line image 1005' having 7/10 of the n-th line and 3/10 of the (n+1)th line. Similarly, by adding a value in which the (n+1)th line is multiplied by 7/10 to a value in which the (n+2)th line is multiplied by 3/10, it is possible to obtain an image having 7/10 of the (n+1)th line and 3/10 of the (n+2)th line.

As described above, by adjusting the addition ratio of adding the n-th line and the (n+1)th line, it is possible to obtain line data for an arbitrary position in one line in the vertical direction.

Note that assuming that the n-th line is generally multiplied by k, the addition ratio is obtained by multiplying the (n+1)th line by $(1-k)$ $(0 \leq K \leq 1)$. If the multiplication ratio is set to 1:0 or 0:1, addition is not performed. Thus, the normal read-out operation is performed.

As set forth above, correction operation in pixel units is achieved by reading out data by the image sensing device 401b. Correction operation for an amount less than one pixel unit is achieved by performing pixel shifting. By this, excellent anti-vibration can be attained.

However, recently an image sensing apparatus sensing both a moving image and a still image has been proposed. Such image sensing apparatus also employs a similar anti-vibration system to the above. However, the anti-vibration system employed by the foregoing conventional image sensing apparatus realizes anti-vibration process by pixel shifting operation. In this case, data stored between pixels are added up, resulting in deteriorated resolution in images. Particularly in a case of sensing a still image wherein a correction between frames by image extraction is not important, a problem of deteriorating resolution in images (hereinafter referred to as a first problem) rather arises.

Next, a second problem of the conventional apparatus will be described.

As a conventional method of anti-vibration, the method disclosed in Japanese Patent Application Laid-Open No. 60-143330 is known.

The conventional method includes an optically and electronically vibration correction methods. According to the optical correction method, vibration is detected from an image sensing apparatus main body by a rotational gyro sensor, and based on the detected result, the optical systems including lens and the image sensing apparatus main body are controlled. According to the electronic correction method, signal transferring of an image sensing device is divided into a high-velocity transfer mode and a normal transfer mode, and the number of pixels transferred in high-velocity transferring is controlled. The above-described conventional examples employs the electronic correction method. The electronic correction method particularly provides an advantage of apparatus size reduction.

In the electronic anti-vibration method, the number of pixels transferred is controlled. In a case of employing an image sensing device reading vertically neighboring pixels simultaneously, the pixel area where signals are normally transferred is shifted at two pixel pitch. This limits a resolving power in anti-vibration.

For a method of improving the resolving power in anti-vibration, the method disclosed in Japanese Patent Application Laid-Open No. 3-132173 is known. According to this method, vertically neighboring two pixels which are read simultaneously by an image sensing device are shifted at one pixel pitch. Since pixels are shifted at one pixel pitch within an image area where signals are normally transferred, smooth pixel movement is achieved.

For instance, in a case of reading pixels, the conventional art reads pixel data at two pixel pitch as shown in FIG. 8A. When shifting read-out data, the conventional apparatus, instead of shifting pixels at two pixel pitch as shown in FIG. 8B, shifts image data at one pixel pitch, as shown in FIG. 8C. By this, a pixel area normally transferred can be shifted at one pixel pitch. In this, regard, since the pixel combinations are different, color process has to be changed later to perform color processing according to the combination of pixels.

Note that in FIGS. 8A, 8B and 8C, Y denotes an yellow color filter; C, a cyan color filter; M, a magenta color filter; and G, a green color filter, Meanwhile, there is a pixel shifting technique available today in which image signals of the vertically neighboring two pixels are added in a predetermined ratio, and an image is shifted by changing the ratio, thereby improving a resolving power in anti-vibration. Herein, pixel shifting will be described with reference to FIG. 9

Referring to FIG. 9, first, an image signal for one horizontal scan period (H) is stored in 1-H delay memory 1701. A first multiplier 1702 multiplies currently inputted image signal by $K_V$. A second multiplier 1703 multiplies the outputs of the 1-H delay memory 1701 by $(1-K_V)$. These multiplied values are added by an adder 1704. By this, when $K_V$ is 1, currently inputted image signal is outputted. When $K_V$ is ½, an intermediate image signal between the currently inputted image signal and the signal in the 1-H delay memory 1701 is outputted. When $K_V$ is 0, an image signal which is 1H prior to what is stored in the 1-H delay memory 1701 is outputted. By virtue of this, it is possible to shift positions of image signals. If the addition ratio is adjusted in small increments, smaller vibration can be accommodated.

However, in the above-described conventional example in FIG. 9, if anti-vibration operation is performed by shifting a pixel area where signals are normally transferred at one pixel pitch, the resolving power is not high enough to perform anti-vibration. As a result, very small vibration remains, or excessive vibration is caused on the contrary. Moreover, performing anti-vibration by pixel shifting causes a problem of "resolution unevenness" and flickers on a screen. Herein, the "resolution unevenness" will be described.

Since pixel shifting is performed by adding image signals of the vertically neighboring two pixels as described above, the resolution is deteriorated. Shown in FIG. 10 is a graph showing deterioration of resolution. The ordinate in FIG. 10 indicates an image position, and the abscissa indicates resolution. Reference numerals 1801 to 1805 denote image signals respectively.

As can be seen from FIG. 10, the highest resolution is achieved when pixel shifting is not performed. The resolution falls to the lowest level when pixels are shifted to an intermediate position of two pixels. Therefore, if pixel shifting to an arbitrary position is performed in anti-vibration control, resolution changes one after another, causing flickers on a screen. This is called "resolution unevenness." The occurrence of the resolution unevenness is the second problem to be solved in the conventional art.

SUMMARY OF THE INVENTION

The present invention is made in consideration of the above situation, and a first object of the present invention is to provide an image sensing method and apparatus capable of performing vibration correction similar to the conventional example when sensing a moving image, and obtaining a sensed image with no image deterioration when sensing a still image, so as to solve the above-described first problem.

A second object of the present invention is to provide an image sensing method and an apparatus capable of eliminating the resolution unevenness while securing a resolving power necessary for anti-vibration, so as to solve the above-described second problem.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A and 7B are explanatory views explaining vertical pixel shifting in the conventional image sensing apparatus;

FIGS. 8A to 8C are explanatory views for explaining brief operation of vibration correction means in the conventional image sensing apparatus;

DETAILED DESCRIPTION OF THE INVENTION

Preferred embodiments of the present invention will be described in detail in accordance with the accompanying drawings.

FIRST EMBODIMENT

First, the first embodiment is described with reference to FIGS. 11 and 12.

Figure 11:
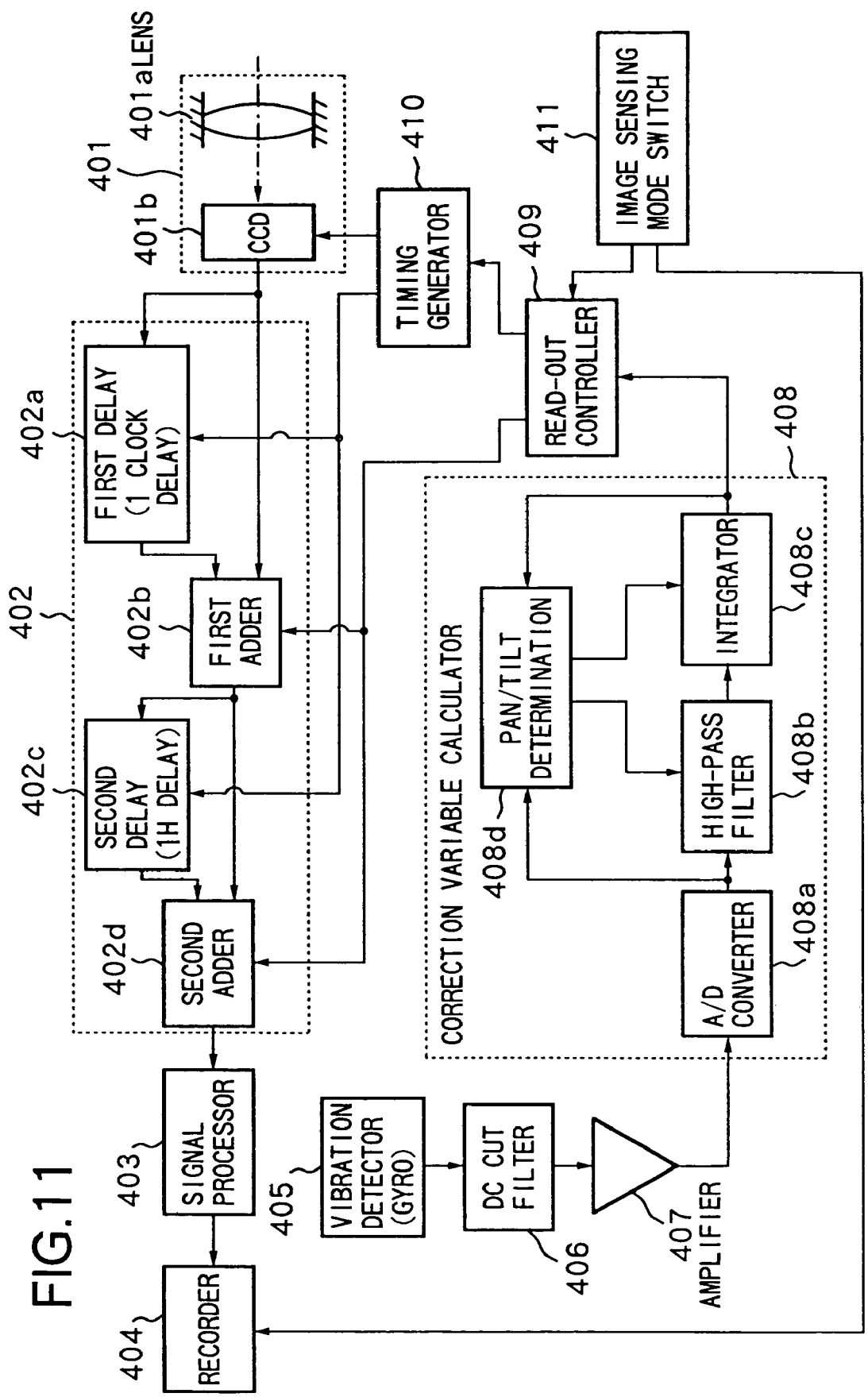
FIG. 11 is a block diagram showing a construction of an image sensing apparatus according to a first embodiment of the present invention.
Figure 12:
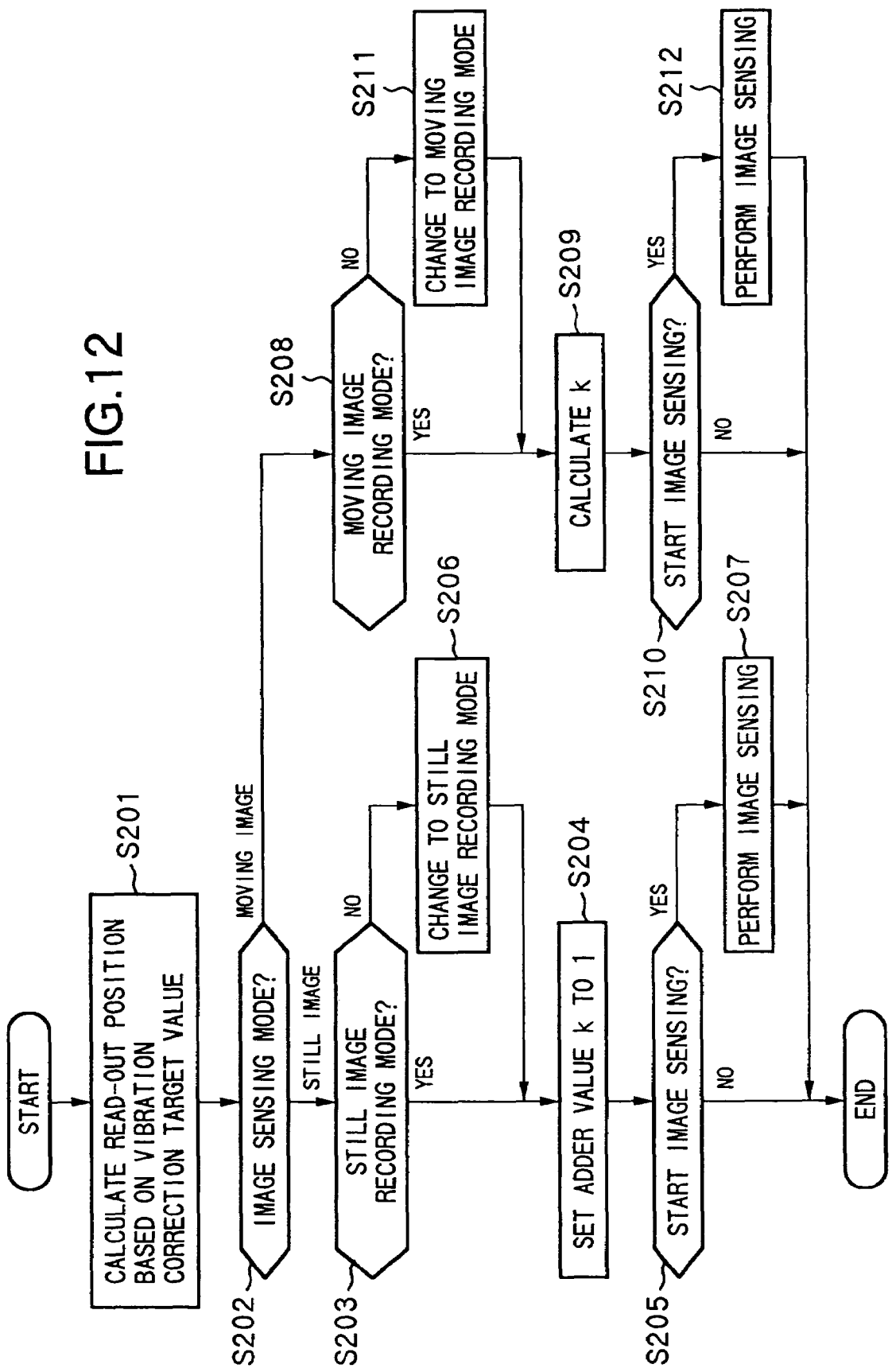
FIG. 12 is a flowchart showing operation steps of pixel shifting control performed by the image sensing apparatus according to the first embodiment of the present invention.

FIG. 11 is a block diagram showing a construction of an image sensing apparatus according to the first embodiment. Components shown in FIG. 11, which are identical to that of the above-described conventional example in FIG. 1, have the same reference numerals.

Figure 1:
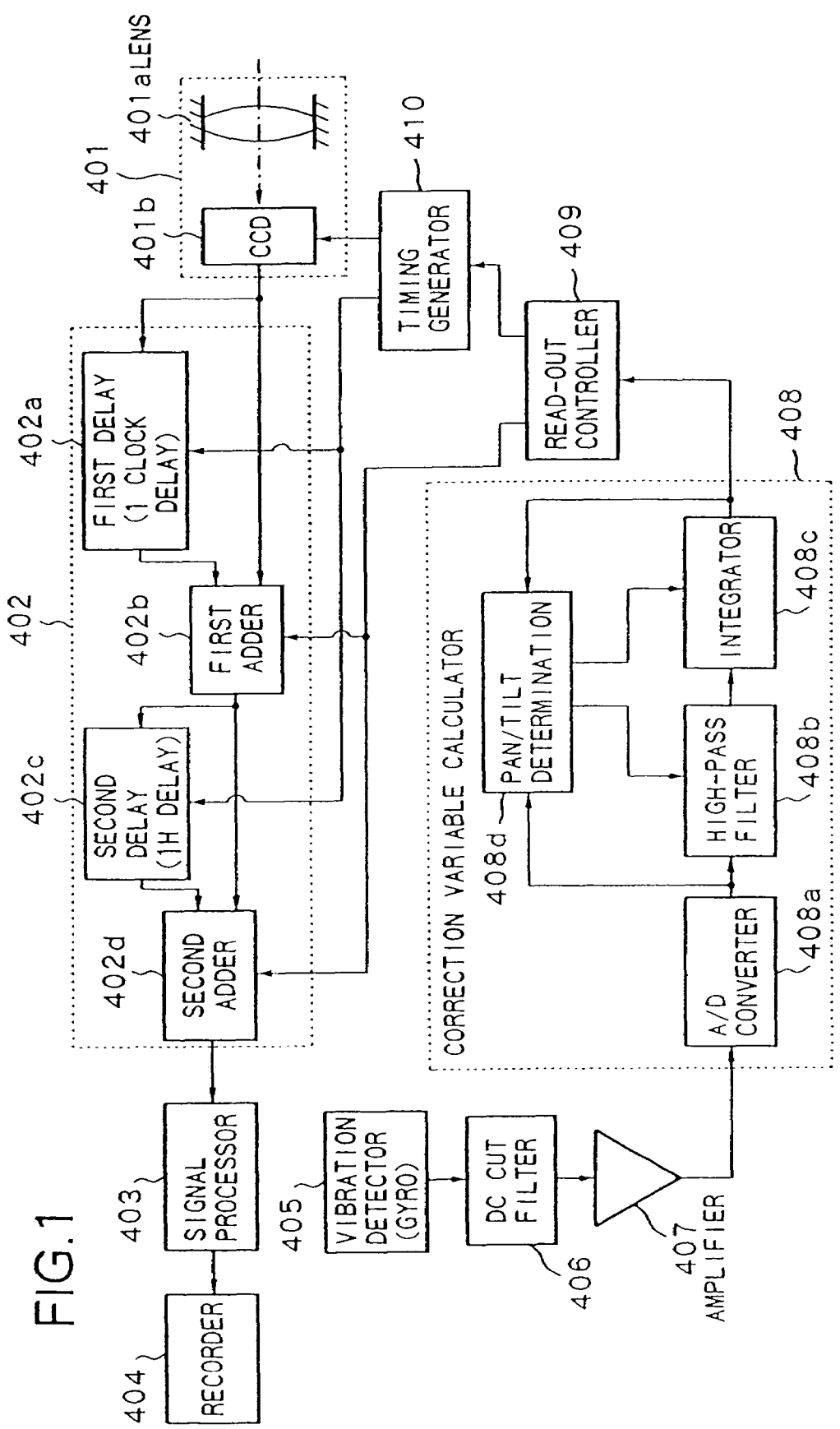
FIG. 1 is a block diagram showing a construction of a conventional image sensing apparatus.
Figure 2:
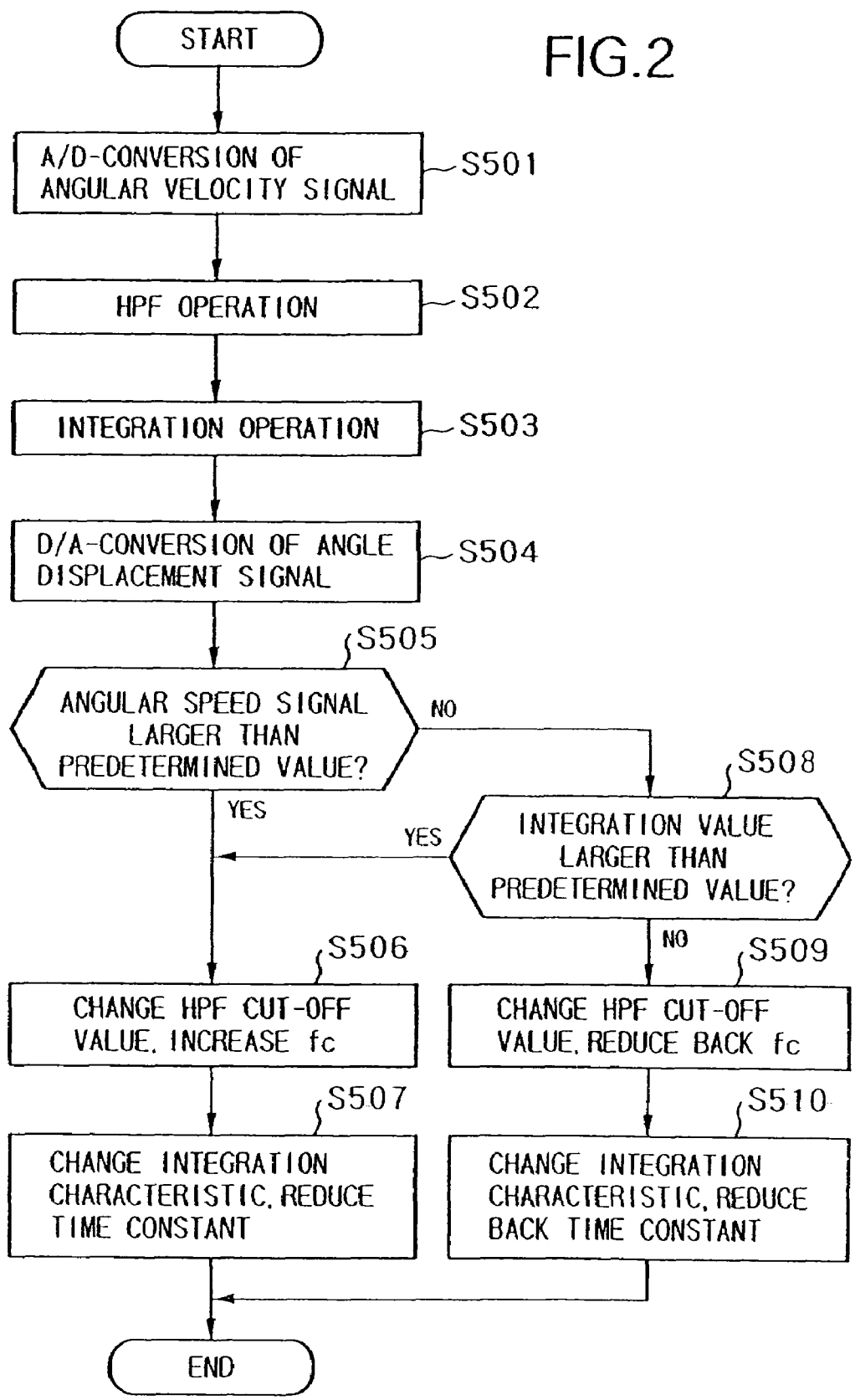
FIG. 2 is a flowchart showing operation steps of panning control performed by the conventional image sensing apparatus.
Figure 3:
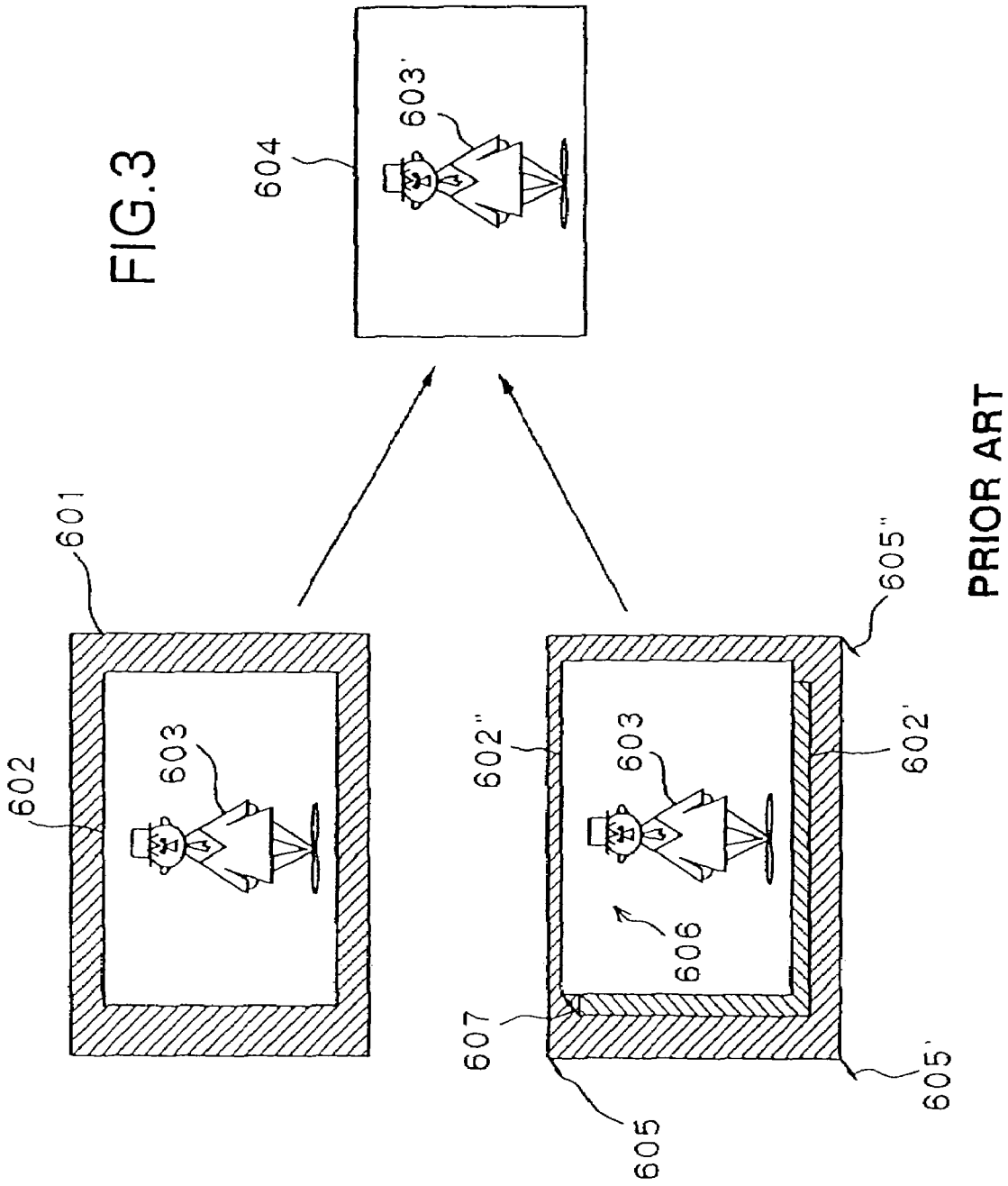
FIG. 3 is an explanatory view for briefly explaining vibration correction means of the conventional image sensing apparatus.
Figure 4:
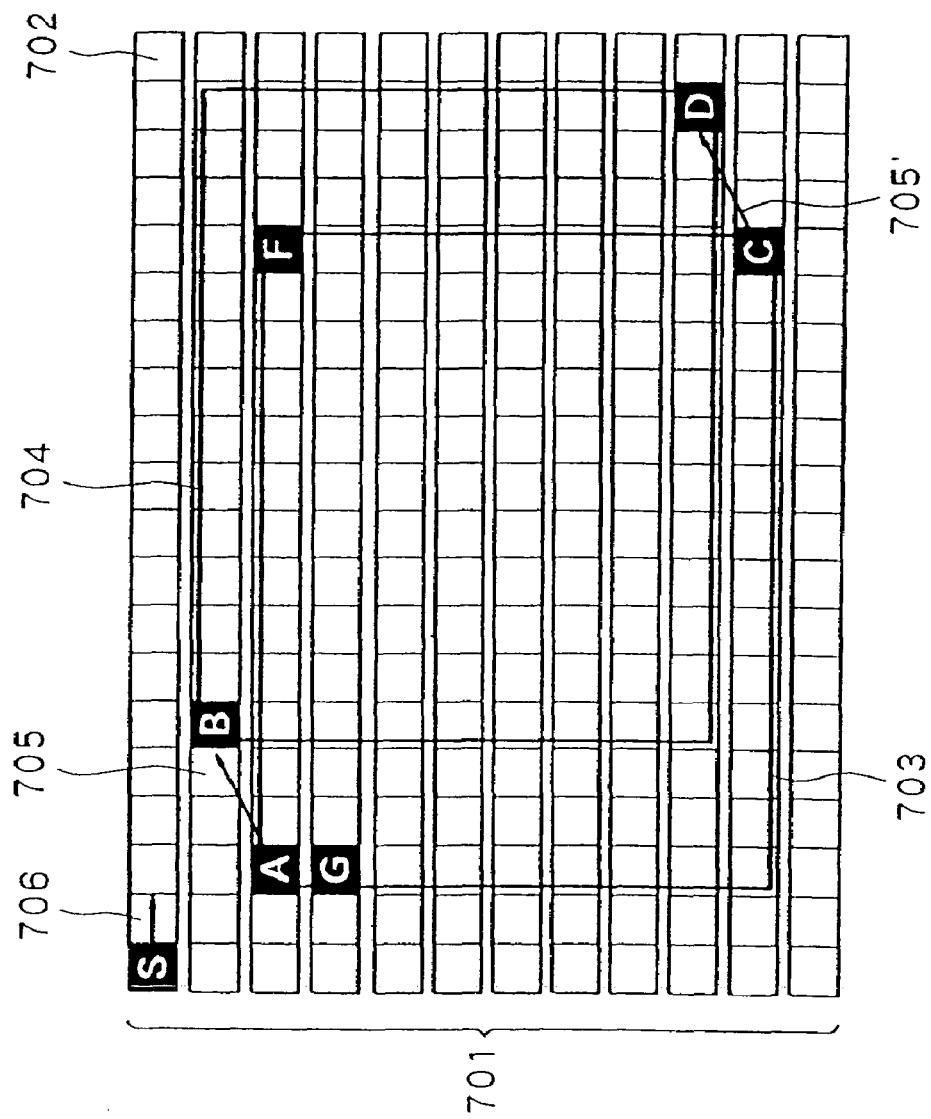
FIG. 4 is an explanatory view for explaining extraction of a stored image by vibration correction means of the conventional image sensing apparatus.
Figure 5:
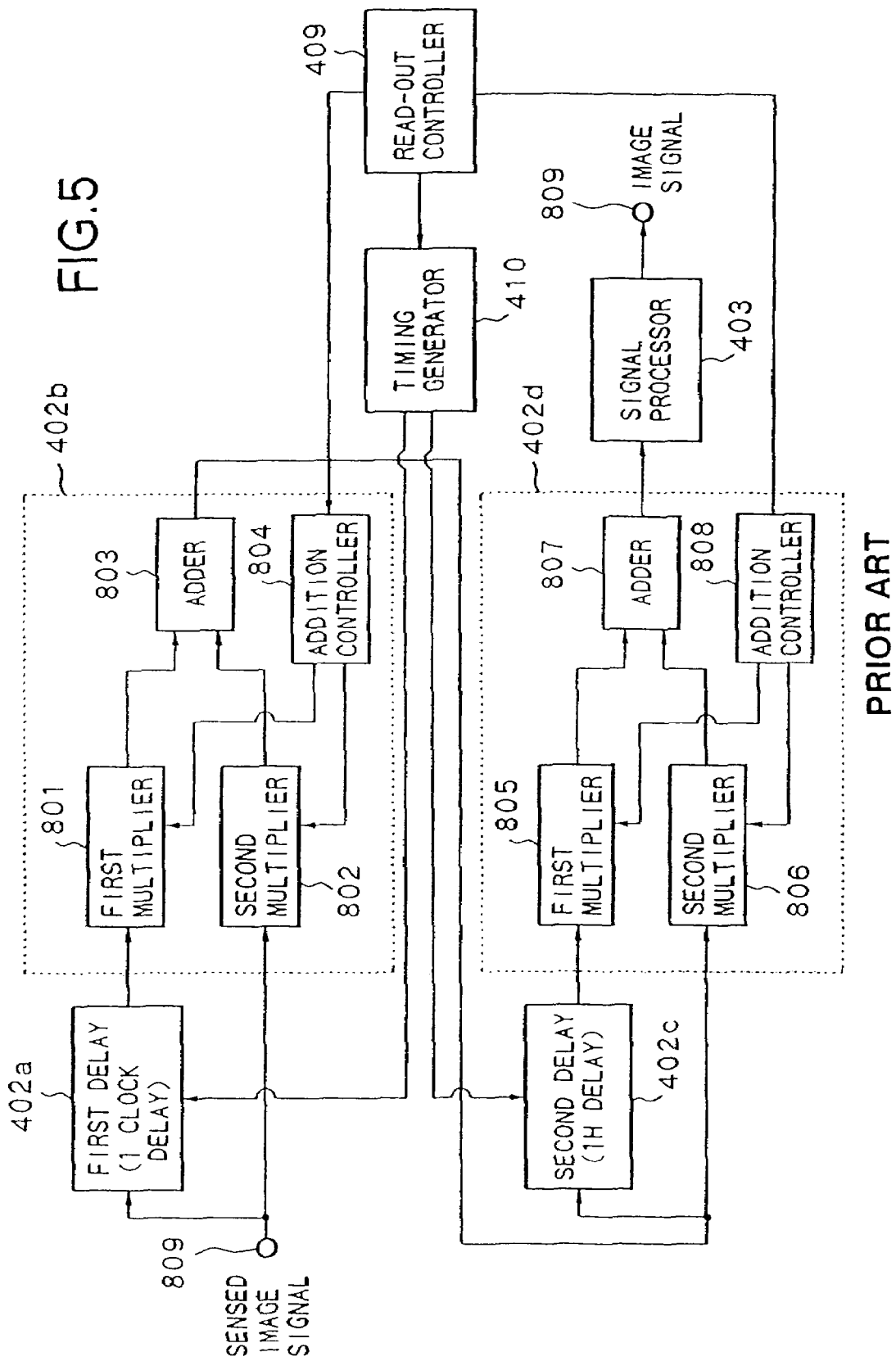
FIG. 5 is a block diagram for explaining pixel shifting in the conventional image sensing apparatus.
Figure 6A:
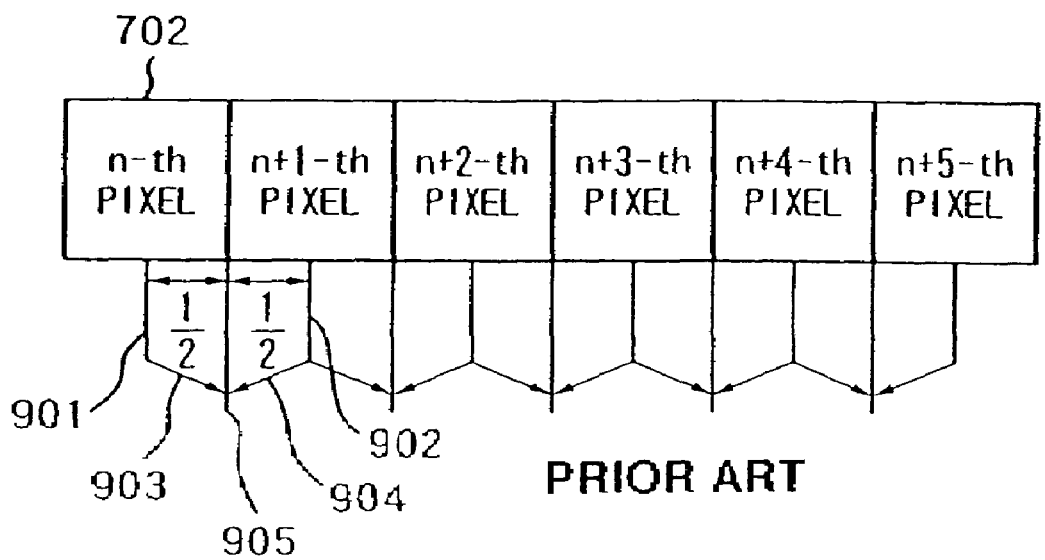
FIGS. 6A and 6B are explanatory views explaining horizontal pixel shifting in the conventional image sensing apparatus.
Figure 6B:
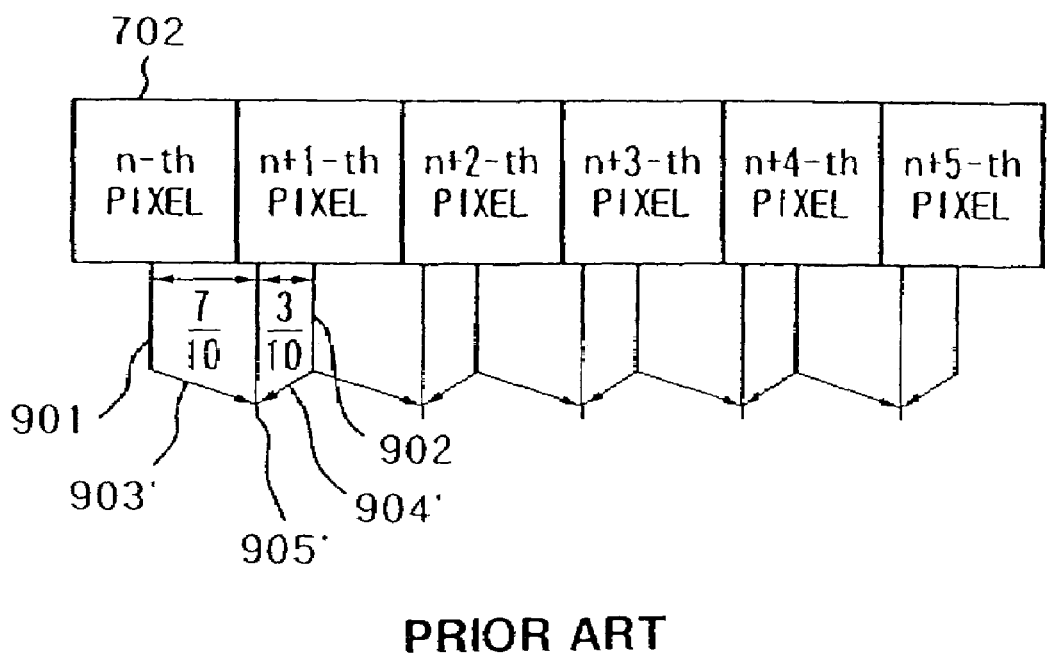
Figure 9:
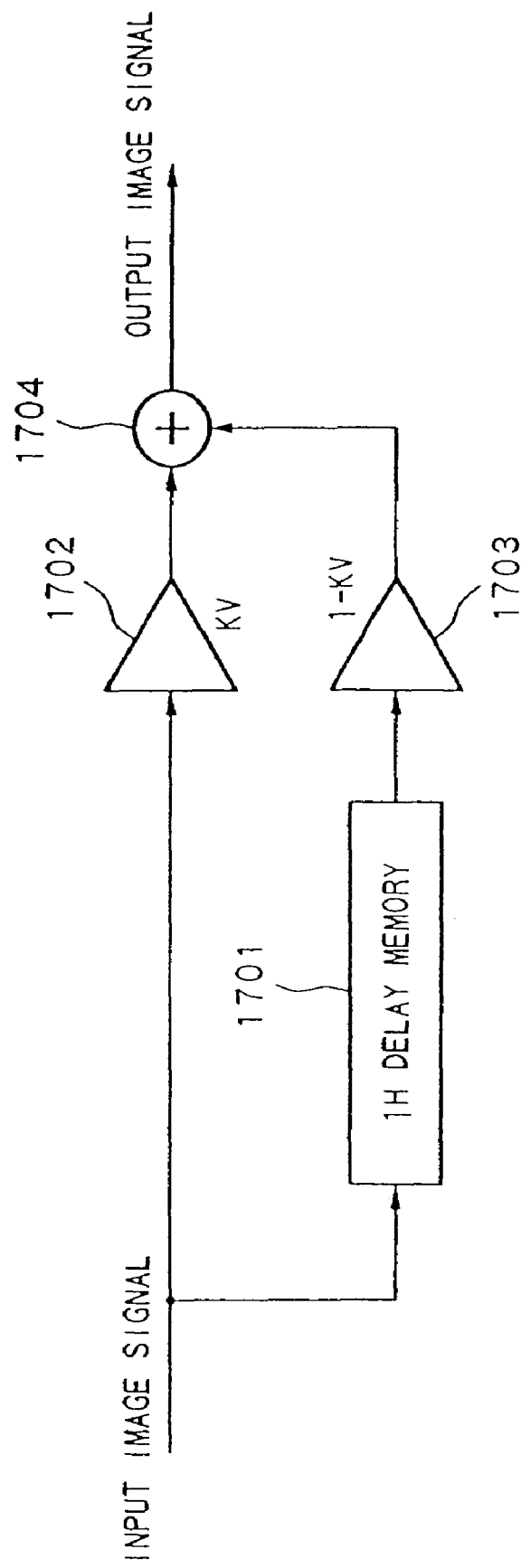
FIG. 9 is a block diagram showing a construction of a section performing pixel shifting in the conventional image sensing apparatus.
Figure 10:
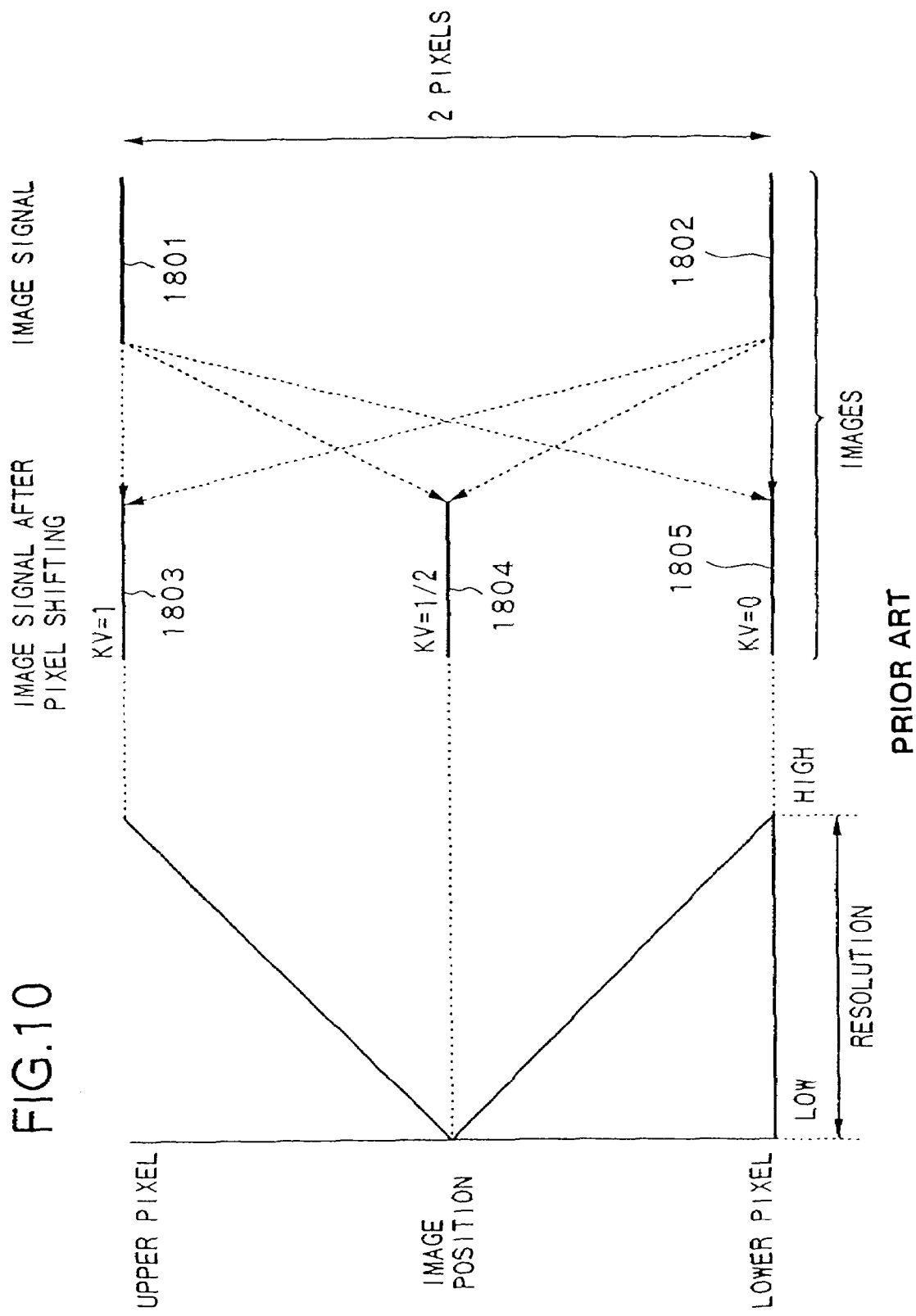
FIG. 10 is a graph showing relationship between an image position upon pixel shifting and resolution, in the conventional image sensing apparatus.

FIG. 11 differs from FIG. 1 by having an image sensing mode switch 411 in addition to the construction shown in FIG. 1. The image sensing mode switch 411 allows users to switch the record mode of the recording section 404, between a moving image recording mode and a still image recording mode. The recording section 404 employs a record format corresponding to the selected image sensing mode, depending on a recording medium.

In the above-described conventional example, the read-out controller 409 respectively controls the timing generator 410 and the first and second adders 402b and 402d based on vibration correction target value data obtained by the correction variable calculator 408. However, in the present embodiment, the read-out controller 409 changes operation of the timing generator 410 and the first and second adders 402b and 402d in accordance with the state of the image sensing mode switch 411.

The operation of the image sensing mode switch 411 is now described with reference to the flowchart in FIG. 12.

First in step S201, a vibration correction target value is obtained by the correction variable calculator 408 based on vibration data obtained by the vibration detector 405. The read-out controller 409 controls read-out operation of the image sensing device 401b so as to perform an anti-vibration correction according to the obtained vibration correction target value. Next in step S202, it is determined whether the image sensing mode switch 411 is set in the moving image sensing mode or in the still image sensing mode. In a case where it is set in the still image sensing mode, it is determined in step S203 whether or not the record mode of the recording section 404 is ready for a still image, i.e., set in the still image recording mode. If the recording section 404 is set in the still image recording mode, the process proceeds directly to step S204, while if the recording section 404 is set in the moving image recording mode, the record mode of the recording section 404 is changed from the moving image recording mode to the still image recording mode in step S206, then the control proceeds to step S204.

In step S204, addition control is performed by setting the value K of the adders 402b and 402d to 1 so as not to perform fine pixel-shifting operation, based on the above-described reason. Then, the control proceeds to step S205 where it is determined whether or not an image sensing start switch (not shown) has been depressed. In a case where the image sensing start switch is not depressed, the process ends without further processing. In a case where the image sensing start switch is depressed, still image sensing is executed in step S207 and the control operation ends.

Meanwhile, in a case where the image sensing mode switch 411 is set in the moving image sensing mode in step S202, it is determined in step S208 whether or not the record mode of the recording section 404 is ready for a moving image, i.e., set in the moving image recording mode. If the recording section 404 is set in the moving image recording mode, the process proceeds directly to step S209, while if the recording section 404 is set in the still image recording mode, the record mode of the recording section 404 is changed from the still image recording mode to the moving image recording mode in step S211, then the control proceeds to step S209.

In step S209, as similar to the conventional example, addition control for fine pixel-shifting operation is performed by calculating an addition ratio value K for the adders 402b and 402d, in order to perform correction for an amount less than one pixel based on the correction target value data. Then, the control proceeds to step S210 where it is determined whether or not an image sensing start switch (not shown) has been depressed. In a case where the image sensing start switch is not depressed, the process ends without further processing. In a case where the image sensing start switch is depressed, moving image sensing is executed in step S212 and the control operation ends.

By the above operation, the fine pixel-shifting operation is performed when sensing a moving image, as conventionally performed. As a result, an image where connections between image fields are smooth is obtained. Meanwhile in a case of sensing a still image, since the fine pixel shifting is not performed, it is possible to obtain an image where resolution is not greatly deteriorated.

MODIFIED EXAMPLE OF FIRST EMBODIMENT

Figure 13:
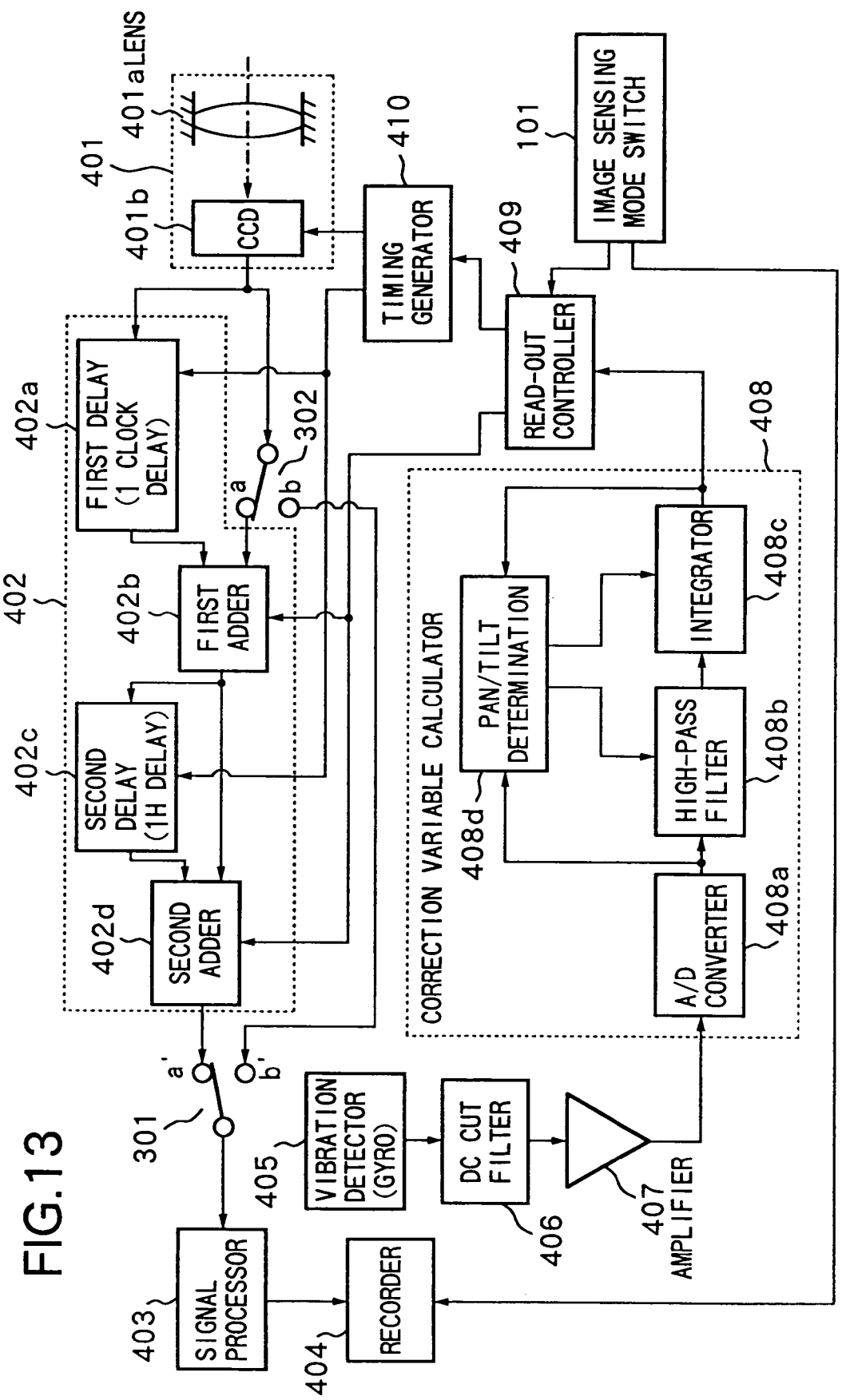
FIG. 13 is a block diagram showing a construction of an image sensing apparatus according to a modified example of the first embodiment.

Next, a modified example of the first embodiment will be described with reference to FIG. 13. FIG. 13 is a block diagram showing a construction of an image sensing apparatus according to a modified example to the first embodiment which will be described later. Components shown in FIG. 13, which are identical to that of the aforementioned conventional example in FIG. 1 and that of the first embodiment in FIG. 11, have the same reference numerals.

FIG. 13 differs from FIG. 11 by having a first switch 301 and a second switch 302 in addition to the construction shown in FIG. 11. The first switch 301 and the second switch 302 select a-a' or b-b' in accordance with the switching mode of the image sensing mode switch 411, wherein a-a' is a route in which image signals flow from the image sensing device 401b to the first adder 402b, then through the second delay 402c and second adder 402d to the signal processor 403, while b-b' is a route in which image signals flow from the image sensing device 401b to the signal processor 403 directly.

A switch, capable of switching the image signal flows may be employed for the first switch 301 and the second switch 302. The switching operation is controlled such that the first switch 301 and the second switch 302 are switched simultaneously.

For sensing a moving image, the first switch 301 and the second switch 302 select the a-a' side so that not only the vibration correction operation which is executed by extracting an image from the image sensing device 401b, but also the above-described pixel shifting control is performed. Accordingly, smooth anti-vibration operation is performed.

For sensing a still image, the first switch 301 and the second switch 302 select the b-b' side so that vibration correction operation, executed by extracting an image from the image sensing device 401b, is performed without using the block including the first delay 402a, the second delay 402c, first adder 402b, and the second adder 402d. Accordingly, a still image where resolution is not deteriorated can be obtained.

SECOND EMBODIMENT

Figure 14:
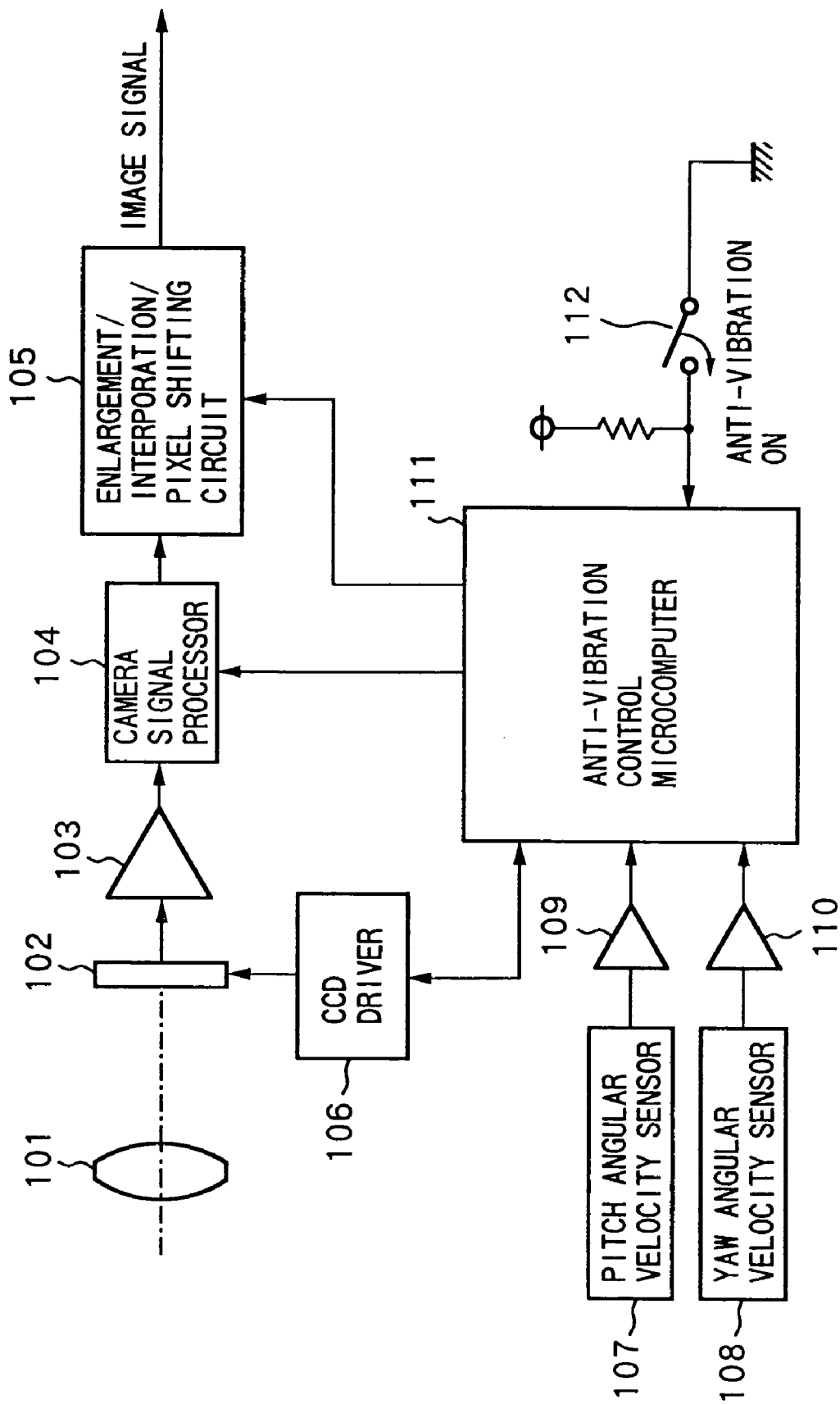
FIG. 14 is a block diagram showing a construction of an image sensing apparatus according to a second embodiment of the present invention.

FIG. 14 is a block diagram showing a construction of an image sensing apparatus (video camera) according to the second embodiment of the present invention. In FIG. 14, reference numeral 101 denotes lenses; 102, an image sensing device such as a CCD or the like; 103, an amplifier; 104, a camera signal processor; 105, an enlargement/interpolation/pixel shifting circuit for performing enlargement process, interpolation process, and pixel shifting process on image data; 106, a CCD driver; 107, a pitch angular velocity sensor; 108; a yaw angular velocity sensor; 109 and 110, amplifiers; 111, an anti-vibration control microcomputer; and 112, a switch. Note that the pitch angle sensor 107 and the yaw angle sensor 108 of the second embodiment correspond to the vibration detector 405 of the first embodiment, and the anti-vibration control microcomputer 111 of the second embodiment correspond to the correction variable calculator 408 of the first embodiment.

An enlargement or magnifying process by the circuit 105 is to compensate for the difference in pixel number of the CCD 102 between in vertical and horizontal directions so that there occurs no difference in resolution between in the directions, and increases the number of apparent pixels by magnifying the image in the less direction in pixel number. The circuit 105 is also capable of performing pixel-interpolation process so as to generate a pixel at shift position where a shift amount of the pixel shift or displacement for anti-vibration includes a shift less than one pixel. Further, the circuit 105 is capable of shifting a read-out start position in the CCD 102. In the second embodiment, since the interpolation process is performed accompanied with the pixel displacement operation, the pixel shift for anti-vibration includes the interpolation operation and the shifting of the read-out start position. Hereafter, a pixel shift operation by shifting the read-out start position will be referred to as "rough pixel shifting", while a pixel shifting in less than one pixel is as "fine pixel shifting".

Referring to FIG. 14, light from an object passes through the lenses 101 and an image is formed on the image sensing device 102. The image on the image sensing device 102 is photoelectrically converted, then amplified to an appropriate level by the amplifier 103, inputted to the camera signal processor 104, and converted to standard video signals.

The image sensing apparatus shown in FIG. 14 comprises an electronic image stabilization function. Activation or non-activation of this anti-vibration function is determined by detecting the state of the switch 112. The pitch and yaw angular velocity sensors 107 and 108 detect vibration angular velocity of the image sensing apparatus. The angular velocity signals are amplified by the amplifiers 109 and 110, and inputted to the anti-vibration control microcomputer 111, then integrated and calculated as an angle displacement. In accordance with the displacement angle θ obtained in the foregoing manner and a focal point distance f of the optical system, the pixels (corresponding to f×tan θ) displaced on the image sensing device 102 due to vibration are shifted to the direction opposite to the displaced direction, thereby performing vibration correction.

Figure 15A:
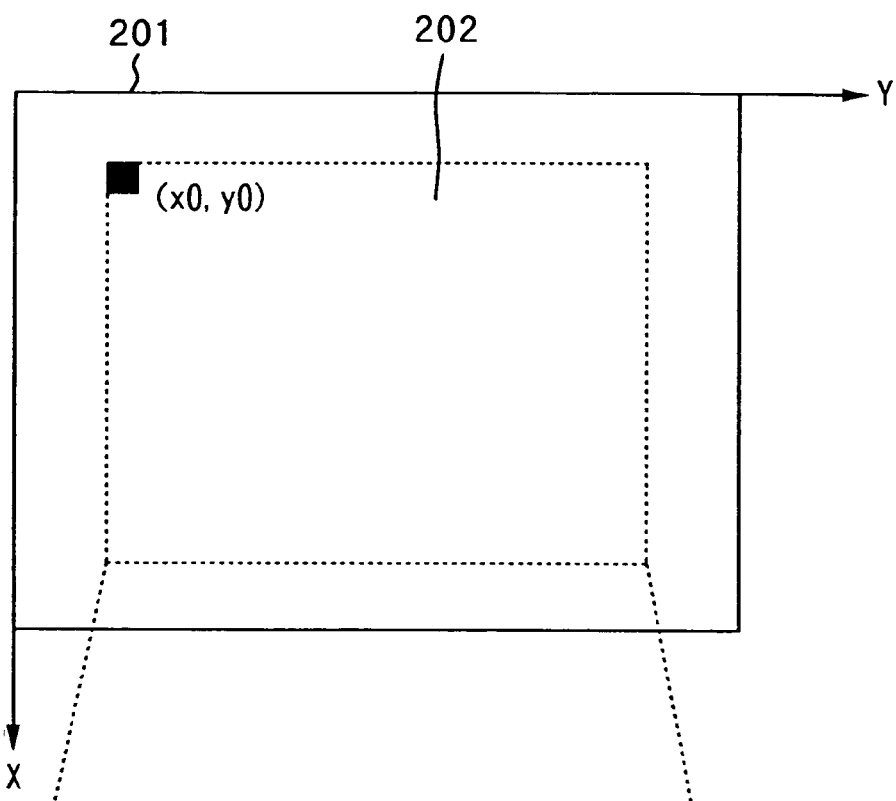
FIGS. 15A and 15B are explanatory views for explaining an image area extracted by electronic anti-vibration control in the image sensing apparatus according to the second embodiment.
Figure 15B:
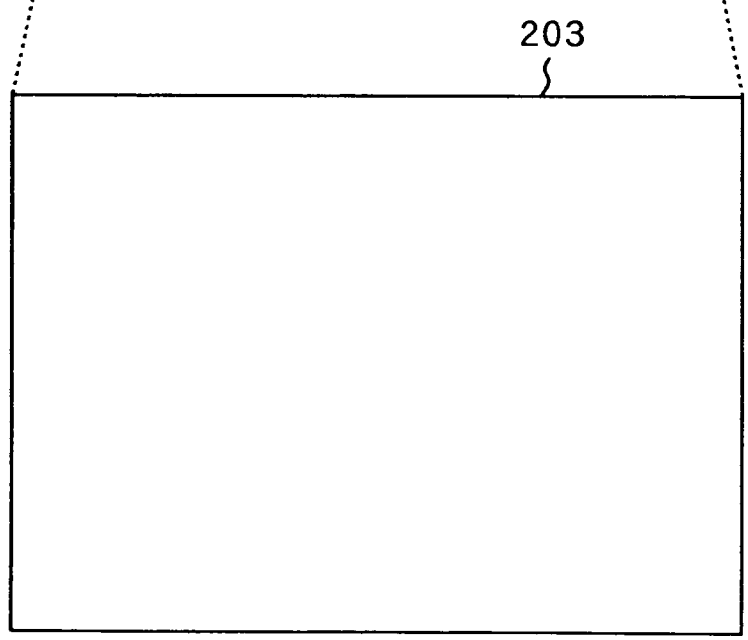

FIGS. 15A and 15B are explanatory views for explaining an image area extracted by electronic anti-vibration control. In FIG. 15A, reference numeral 201 denotes an effective pixel area of the image sensing device 102. The start point ($x_0$, $y_0$) of a section 202 (hereinafter referred to as a partial area 202) of the effective pixel area is moved in the range of the effective pixel area 201 in a way that only the partial area 202 is extracted and vibration correction is performed. Then, the partial area 202 only is displayed on a monitor such as a video monitor or a finder or the like.

As a technique of such displaying operation, the first technique is to temporarily store an image for the effective pixel area 201 by using a field memory, and while reading the image for the partial area 202 from the memory, enlarge the image so as to fit in the area 203 shown in FIG. 15B and interpolate the horizontal/vertical scan lines. The second technique is to employ a large CCD having high density and a large number of pixels as the image sensing device 102 so that the extraction area of the partial area 202 satisfies the number of scan lines necessary for the standard video signals. Both techniques require an expensive field memory or a large CCD. Therefore, the second embodiment of the present invention utilizes a CCD for the widely used PAL (phase alternation line) for an image sensing apparatus complying with the NTSC (National Television System Committee).

The CCD for PAL has a high pixel density in the vertical direction. Therefore, with respect to the vertical scan direction, an image may be extracted without further process by using the CCD driver 106, e.g., a timing generator or the like. With respect to the horizontal scan direction, enlargement process is performed in a vertical-horizontal ratio by using a line memory. By this, an inexpensive vibration correction apparatus is realized.

The image sensing apparatus in FIG. 14 has a construction having the above-described correction system. When pixel shifting is performed in the vertical scan direction, rapid drain control is performed by the CCD driver 106 to extract a desired scan area. Specifically, in the second embodiment, image data is read out of the CCD 102, alternately as illustrated in FIG. 8B and FIG. 8C. The alternate reading-out causes to change pixel combinations, the camera signal processor 104 is controlled such that color process corresponding to the pixel arrangement is performed. When pixel shifting is performed in the horizontal scan direction, a read-out start position of a horizontal scan image, stored in the enlargement/interpolation/pixel shifting circuit 105 where image signals processed by the camera signal processor 104 are inputted, is varied in accordance with the amount of pixel shifting for vibration correction, and the enlargement and interpolation are performed in an appropriate vertical-horizontal ratio. With regard to shifting an amount less than one pixel (hereinafter referred to as a "decimal fraction section"), the enlargement/interpolation/pixel shifting circuit 105 can perform fine pixel shifting.

Anti-vibration control operation of the image sensing apparatus according to the second embodiment will be described with reference to the flowcharts in FIGS. 16 and 17.

Figure 16:
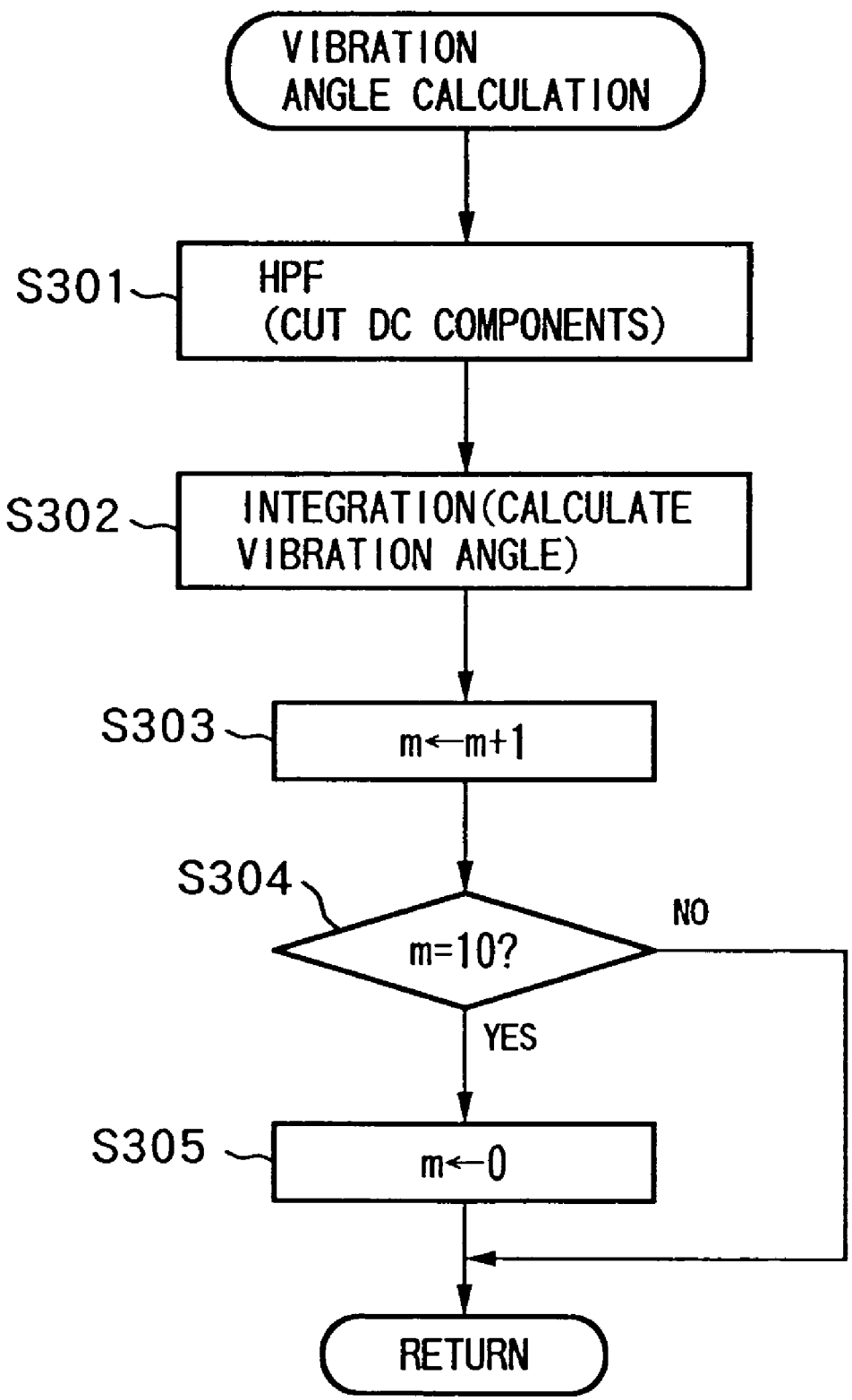
FIG. 16 is a flowchart showing operation flow of the image sensing apparatus according to the second embodiment.

The flowchart in FIG. 16 shows a process of calculating an angle displacement by integrating the angular velocity signals detected by the angular velocity sensors 107 and 108. This process is a periodic interruption process executed by the anti-vibration control microcomputer 111, and executed with a frequency ten times larger than the field frequency, i.e., 600 Hz in a case of the NTSC, in the second embodiment. This frequency corresponds to a sampling frequency of the angular velocity signal i.e., the frequency of the calculated angle displacement. The interruption process of the anti-vibration control microcomputer 111 starts when, for instance, a counter counting up/down at a predetermined frequency dividing of an oscillation clock coincides with data corresponding to 1/600 sec. Although angular velocity signals are inputted to an A/D converter of the anti-vibration control microcomputer 111 as described in FIG. 14, for the purpose of simple description of the present embodiment, it is assumed herein that the operation mode of the A/D converter is set in a scan mode in which A/D operation is repeated all the time.

Referring to FIG. 16, first in step S301, angular velocity signals obtained as an A/D sample are subjected to high-pass filtering process so as to remove an influence of DC components. Next in step S302, the angular velocity signals, in which band area is limited, are integrated and an angle displacement is calculated. The calculated angle displacement corresponds to the displacement angle of the image sensing apparatus body. The processes performed during steps S303 and S305 are the routine for determining whether or not displacement angle calculation is performed ten times in one field. More specifically, in step S303, a register m storing the number of times parameters is incremented by one. In step S304, it is determined whether or not m=10 is satisfied. If m=10 is satisfied, i.e., if the interruption process has been performed ten times, m=0 is set in step S305 and initialization is performed for the next field. Then, the control operation ends.

Meanwhile, if m=10 is not satisfied in step S304, i.e., if the interruption process has not been performed ten times, the aforementioned step S305 is skipped and the control operation ends.

Figure 17:
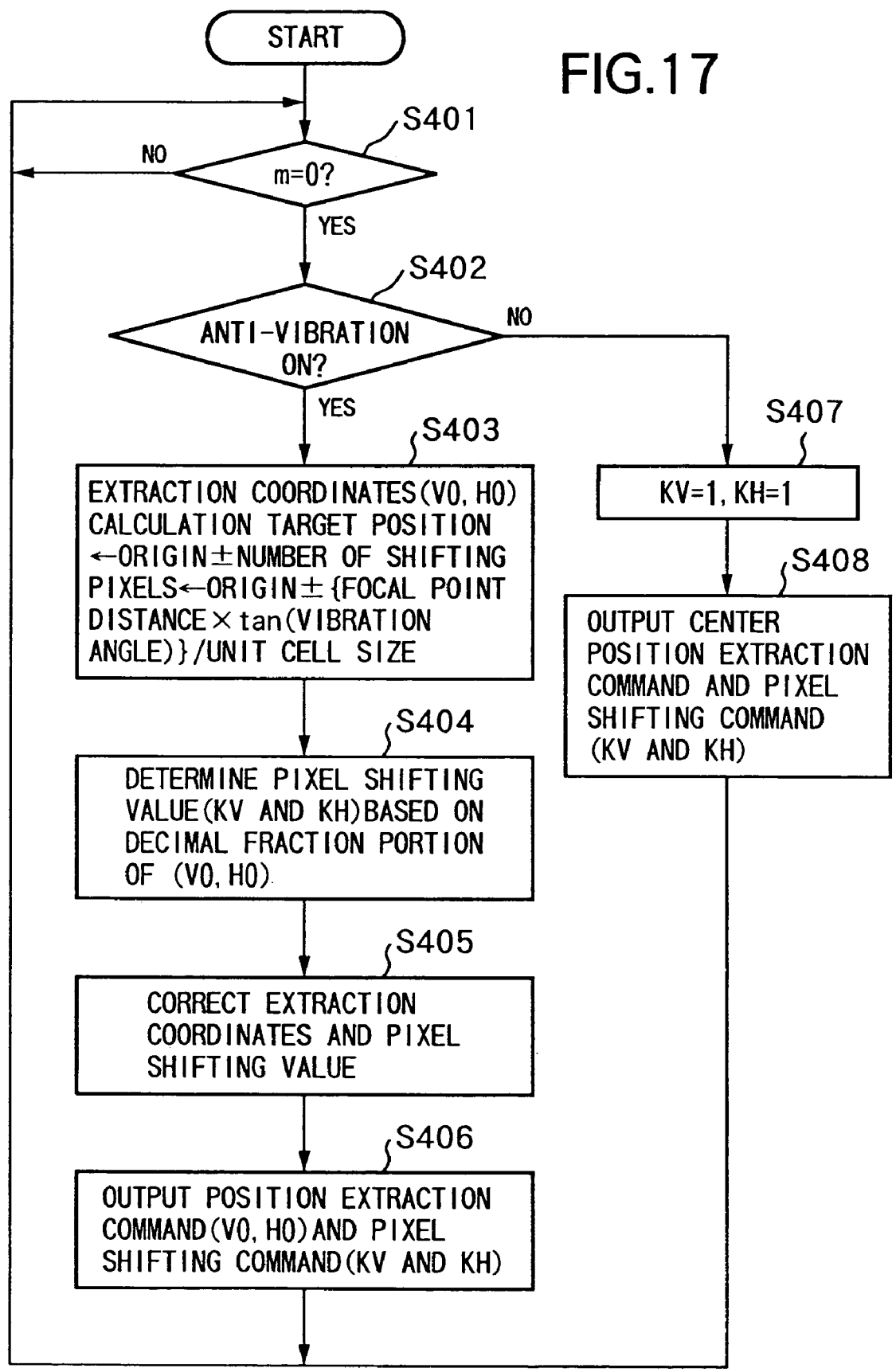
FIG. 17 is a flowchart showing operation flow of the image sensing apparatus according to the second embodiment.

The control steps shown in FIG. 17 are performed once for each processing period of one field. The control steps shown in FIG. 16 are executed ten times in the processing period of one field. The control steps in FIG. 17 are performed before starting the process for the next field, i.e., at the end of the process for the present field.

Figure 18:
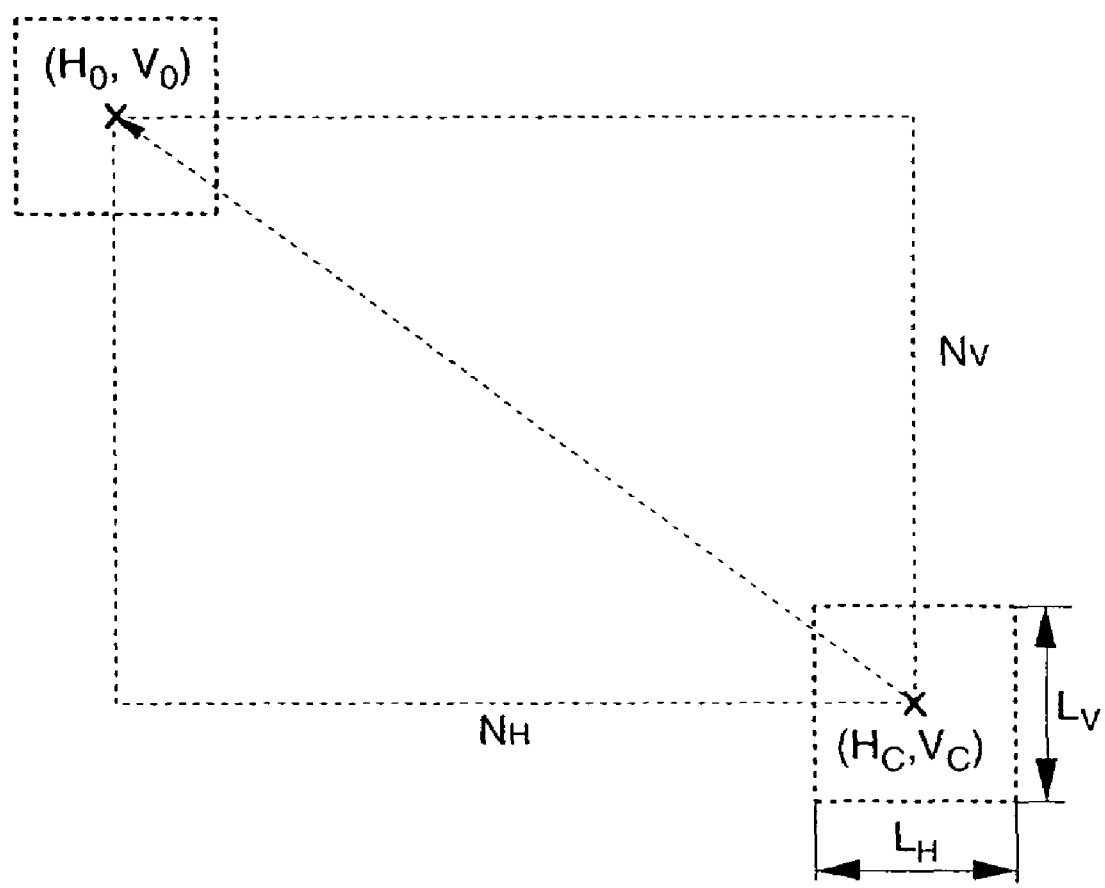
FIG. 18 illustrates a position ($H_0$, $V_0$) where an image extraction (image shifting) is started with respect to the position ($H_C$, $V_C$) without image shifting.

Referring to FIG. 17, in step S401, determination of m=0 is made until m=0 is satisfied. When m=0 is satisfied, i.e., the interruption process has been performed ten times in the present field and m is initialized, it is determined in the next step S402 whether or not anti-vibration function is activated based on the state of the switch 112. If the switch 112 is ON, i.e., anti-vibration function is activated, the calculation process is executed for calculating target position coordinates ($V_0$, $H_0$) of the extraction position. Herein, the target position is given by the following equations (1) and (2) with reference to FIG. 18:

$$V_0 = V_c \pm N_v = V_C \pm (-1) \cdot \frac{f \cdot \tan\theta_P}{L_V} \quad (1)$$

$$H_0 = H_c \pm N_v = H_C \pm (-1) \cdot \frac{f \cdot \tan\theta_Y}{L_H} \quad (2)$$

where $V_c$ and $H_C$ denote vertical and horizontal positions respectively where a reading out starts when the vibration correction is not necessary, $\theta_P$ and $\theta_Y$ denote displacement angles in pith and yaw directions, respectively, $L_V$ and $L_H$ are vertical and horizontal lengths of the CCD, respectively, and $N_V$ and $N_Y$ are numbers of shifting pixels for correcting displacement angle in the pitch and yaw directions.

$H_0$ and $V_0$ obtained by the above equations (1) and (2) are coordinates where the reading-our starts for anti-vibration control, and thus, is expected to have an integer part and a decimal fragment part. The decimal fragment part includes important information for performing the anti-vibration control with maintaining a resolution, and a shift amount represented by the part is less than one pixel. The rough pixel shift control performed by the circuit 105 is achieved by means of reading out of a memory each unit of which corresponds to one pixel. The information included in the decimal fragment part is utilized in the interpolation operation by the circuit 105, namely the fine pixel shift control.

Reading out of the CCD 102 according to the second embodiment comprises interlaced readings at even number lines and odd number lines which occur every two lines (pixels in the vertical direction). Further, the readings every two pixels are only made for vertical readings but not for horizontal readings of the CCD 102. Therefore, the fine pixel shifting according to the second embodiment must be different for in the vertical and horizontal directions from each other.

First, the method and scheme for shifting an extraction area and a fine pixel shifting in the vertical direction will be described below. Letting an integer part and decimal part of the shift amount $V_0$ in the vertical direction as Int($V_0$) and Dec($V_0$), respectively, the following equation holds:

$$V_0 = Int(V_0) + Dec(V_0) \quad (3)$$

Where Int($V_0$) is odd number, and Evn($V_0$) denotes the greatest even number which does not exceed the number $V_0$, it holds:

$$V_0 = Evn(V_0) + 1 + Dec(V_0) \quad (4)$$

and where Int($V_0$) is an even number, it holds:

$$V_0 = Evn(V_0) + Dec(V_0) \quad (5)$$

The second embodiment performs an extraction operation of the image area accompanied with CCD reading-out as illustrated in FIG. 8B, e.g., and an extraction operation accompanied with CCD reading-out as illustrated in FIG. 8C. In the second embodiment, while the extraction operates is performed, a fine pixel shifting by less than one pixel is operated in accordance with the value of Dec($V_0$) for each pixel.

Described will be the fine pixel shifting in the vertical direction below.

In order to initiate the fine pixel shifting, it is necessary to determine a distribution ratio K between two adjacent pixels in step S404. At first, distribution ratio $K_V$ in the vertical direction will be described. In the second embodiment, the distribution ratio in the vertical direction $K_V$ is determined in accordance with Dec($V_0$) or 1+Dec($V_0$), and is determined to be as 1/8 or 7/8.

Figure 19:
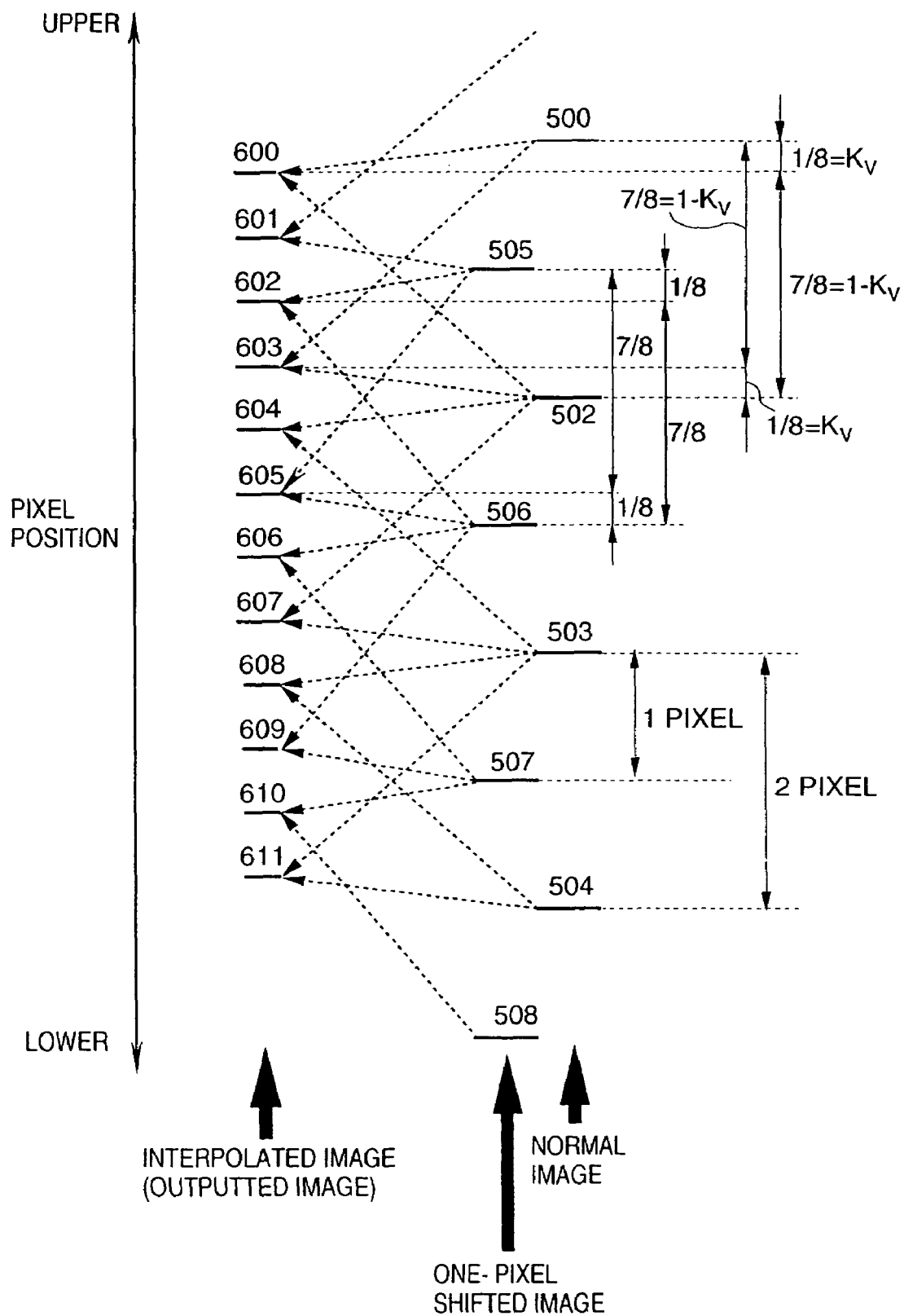
FIG. 19 illustrates how interpolated pixels are generated from image signals.

As set forth above, CCD reading out according to the second embodiment is performed at two pixel pitch. Thus, fine pixel shifting with shift amount of less than one pixel would deteriorate resolution at interpolated pixels because the interpolations are made between two pixels with two pixel distance apart. The second embodiment performs interpolations as illustrated in FIG. 19 in order to achieve both the prevention of unevenness in resolution and high resolution. In FIG. 19, the vertical axis represent image (pixel position). 500 to 503 represent an image signal (signals obtained by the reading-out as illustrated in FIG. 8B), 504-506 denote image signals with one pixel shift with respect to the signals 500 to 503 (signals obtained by the reading-out as illustrated in FIG. 8C). 600 to 612 are image signals generated by interpolating the image signals 500 to 508. The interpolated image 600 is generated by a proportional distribution (ratio 1/8:7/8) of the image data 500 and 502, and the interpolated image signal 603 is with proportional distribution ratio 7/8:1/8, from image signals 500 and 502. On the other hand, the interpolated image 604 is generated by a proportional distribution (ratio 1/8:7/8) of the image data 502 and 503, and the interpolated image signal 608 is with proportional distribution ratio 7/8: 1/8, from image signals 502 and 503.

Figure 20:
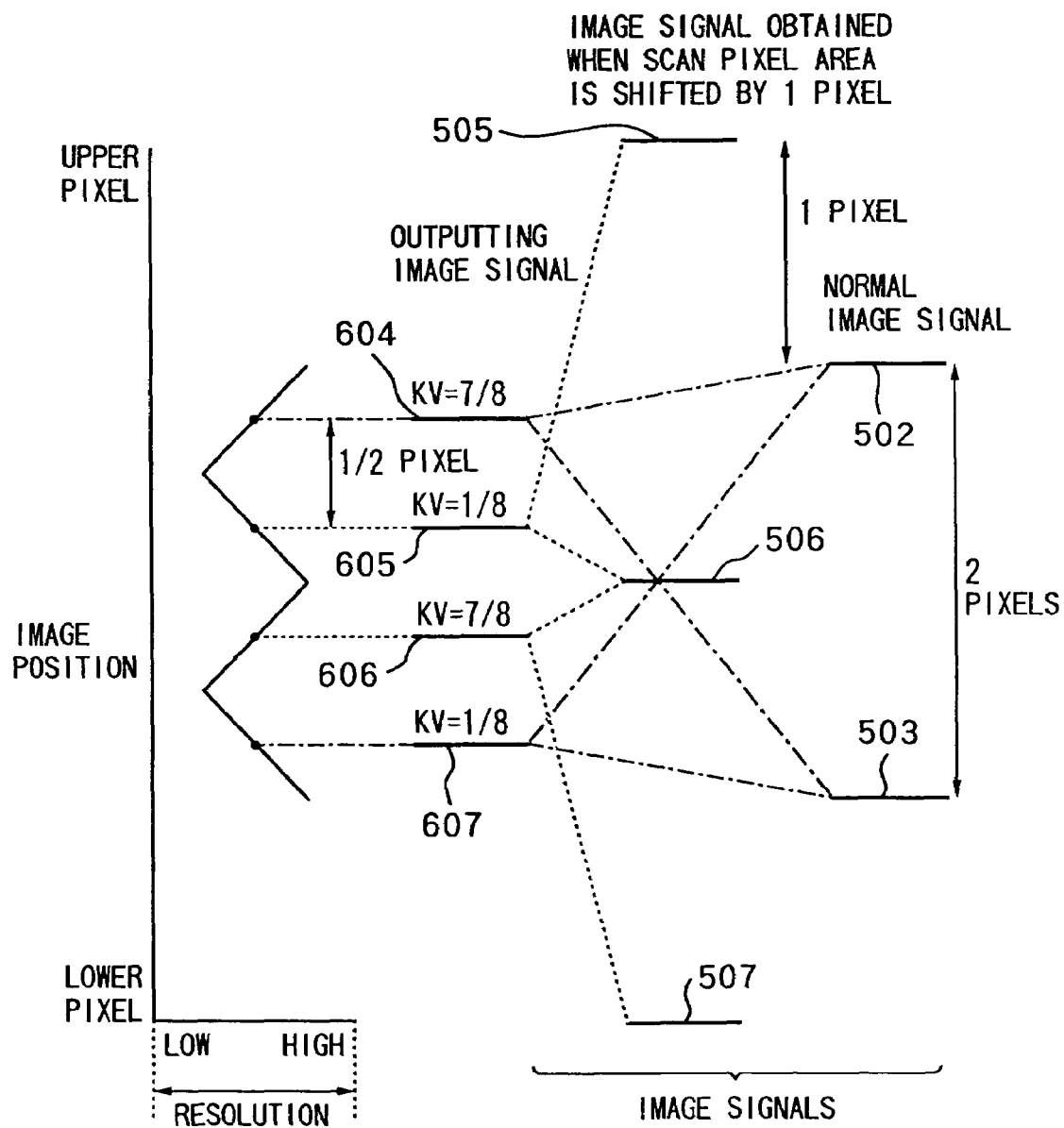
FIG. 20 is a graph for explaining a process of regenerating correction variable data in the image sensing apparatus according to the second embodiment.

FIG. 20 illustrates the image signals 502, 503, 505, 506, 604, 605, 606 and 607 extracted from FIG. 19 so that a reason why the uneven resolution is prevented according to the second embodiment is explained, As seen from FIG. 20, pixels of the interpolated images (that are output image signals) are apart from each adjacent pixel by ½ pixel distance. In other words, the interpolation image has twice as fine in space resolving power as original images. The image signal 604, e.g. is generated by proportionally distributing the image signals 502 and 503 with ratio of 1:7, while the image signal 605 is generated by proportionally distributing the image signals 505 and 506 with ratio of 7:1. Thus, a resolution at the pixel 604 is identical with that at the pixel 606, and a resolution at the pixel 605 is identical with that at the pixel 606. Further, a resolution at the pixel 606 is identical with that at the pixel 607. Accordingly, the pixels 604, 605, 606 and 607 are arranged at even intervals in the vertical direction, and exhibit the same resolution. In other words, there are no uneven resolutions between the image signals 604, 605, 606 and 607. More specifically, in the second embodiment, arbitrary two subsequent pixels are converted into four pixels between which there is no uneven resolution. This is because all the interpolated pixels are generated on the basis of the same pair of distribution ratio values (pairs of "1" and "7", or pairs of "1/8" and "7/8").

The subsequent two pixels include a pixel on an even number line and a pixel at an odd number line, as seen from FIGS. 8B and 8C. Thus, the value of Int($V_0$) obtained from the equation (3) can indicate which should be referenced, pixels on an even number line or odd number line. Further, since the pitch of interpolated pixels is equal to ½ (=0.5) pixel, K, can be set to 1/8 or 7/8 depending on whether Dec($V_0$) is less than or greater than 0.5. As set forth above, the value of $V_0$–Evn($V_0$) can be any value within 0 to 2. Therefore, in order to prevent uneven resolution, it is necessary to determine K, to be either one of 1/8 or 7/8 by quantization.

Figure 21:
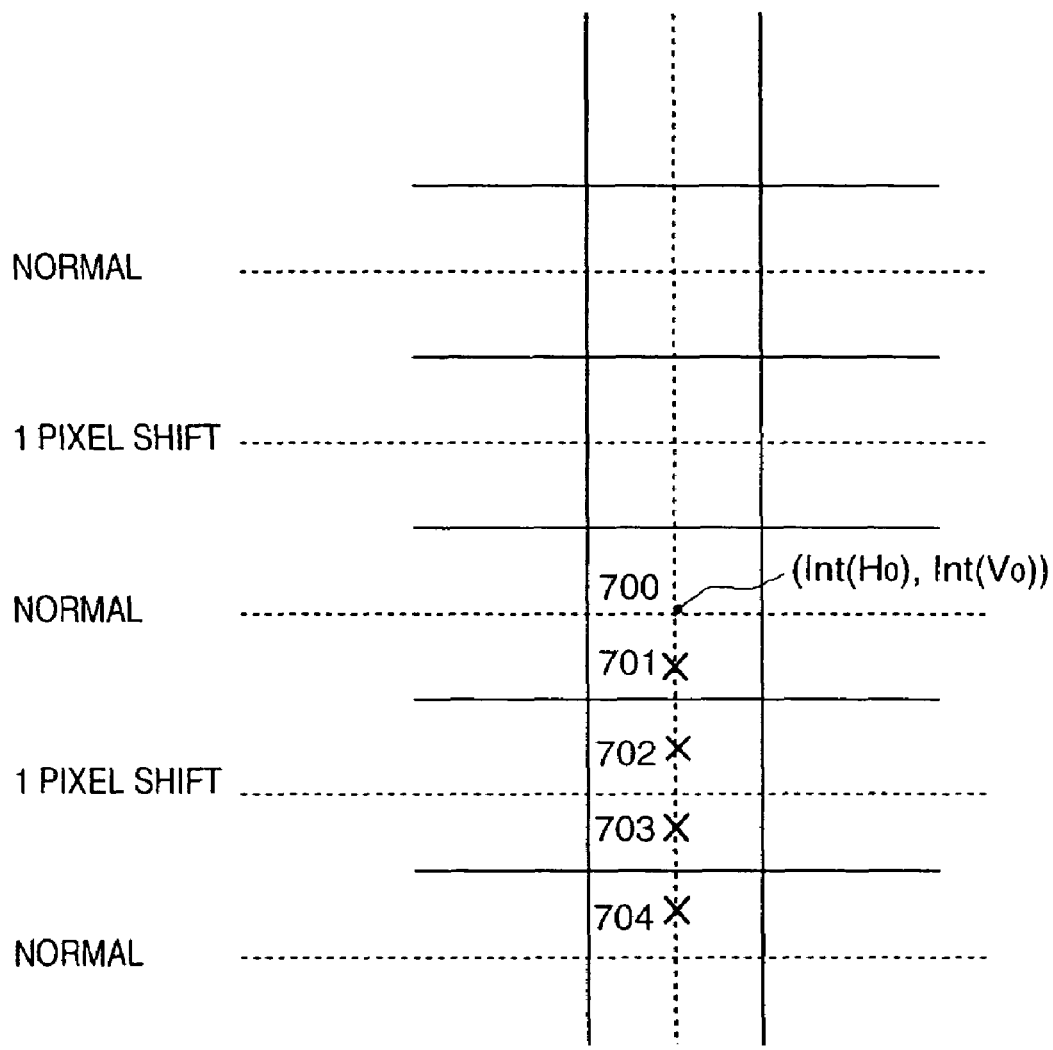
FIG. 21 illustrates how interpolated pixels are quantized so that they are equally spaced.
Figure 22:
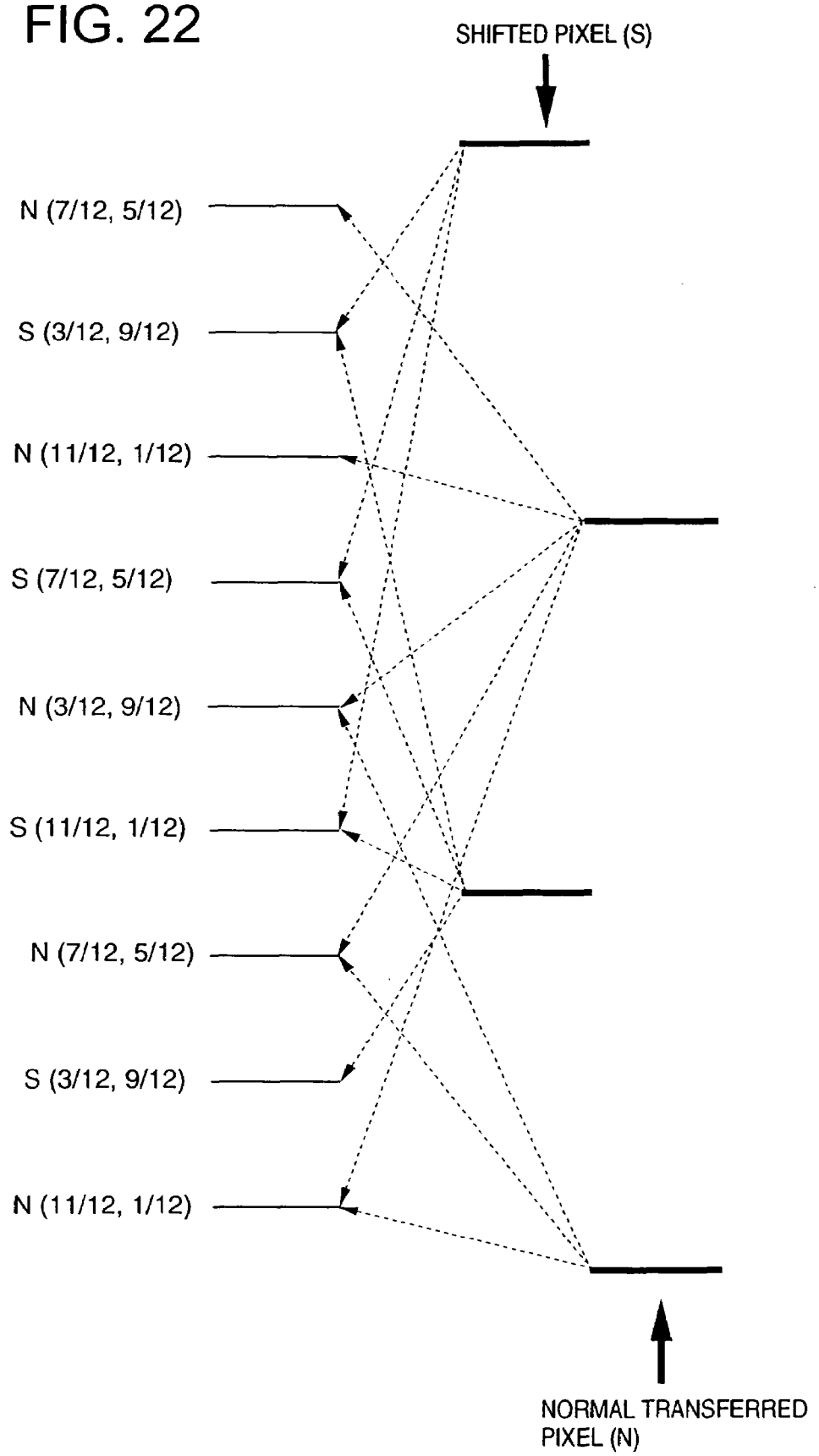
FIG. 22 illustrates how interpolated pixels are generated where a resolving power is raised to three times.

FIG. 21 explains a distribution of values of $K_V$ according to the second embodiment, and therefore, how $K_V$ are quantized. In FIG. 21, 700 denotes a position where an image extraction starts when Dec($V_0$) is equal to "0", and points 701 to 704 denote a position where an image extraction starts when Dec($V_0$) is unequal to "0". As set forth above, the decimal fragment part $V_0$–Evn($V_0$) of the starting point $V_0$ can be within the range 0 to 2. Specifically, extraction starting point is coincident with:

point 701 when $0 < V_0-Evn(V_0) \leq 0.5$, point 702 when $0.5 < V_0-Evn(V_0) \leq 1.0$, point 703 when $1.0 < V_0-Evn(V_0) \leq 1.5$, point 704 when $1.5 < V_0-Evn(V_0) \leq 2.0$.

As seen from the comparison of FIGS. 19 and 20, if ($V_0$–Evn($V_0$))=0, start point in the vertical direction is coincident with the point 700. If $0 < V_0-Evn(V_0) \leq 0.5$, the start point 701 should be quantized into the pixel 600, therefore, $K_V$ is set to 1/8. In this case, normal image data which are not subjected to one pixel shifting (image data read-out in accordance with the FIG. 8B timing) are used.

if ($V_0$–Evn($V_0$))=0, the start point in the vertical direction is set to be coincident with the point 700.

If $0 < V_0-Evn(V_0) \leq 0.5$, the start point 701 should be quantized into the pixel 600, therefore, $K_V$ is set to 1/8. In this case, normal image data which are not subjected to one pixel shifting (image data read-out in accordance with the FIG. 8B timing) are used.

If $0.5 < V_0-Evn(V_0) \leq 1.0$, the start point 702 should be quantized into the pixel 603, therefore, $K_V$ is set to 7/8. In this case, normal image data which are not subjected to one pixel shifting (image data read-out in accordance with the FIG. 8B timing) are used.

If $1.0 < V_0-Evn(V_0) \leq 1.5$, the start point 703 should be quantized into the pixel 602, therefore, $K_V$ is set to 1/8. In this case, normal image data which are subjected to one pixel shifting (image data read-out in accordance with the FIG. 8C timing) are used.

If $1.5 < V_0-Evn(V_0) \leq 2.0$, the start point 704 should be quantized into the pixel 605, therefore, $K_V$ is set to 7/8. In this case, normal image data which are subjected to one pixel shifting (image data read-out in accordance with the FIG. 8c timing) are used.

The above describes how $K_V$ is determined in step S404 according to the second embodiment.

Next, the pixel shifting in the horizontal direction will be explained. As set forth above, reading out of the CCD 102 is performed in accordance with the read out sequence as illustrated in FIG. 8B or that sequence as illustrated in FIG. 8C. Such modulation according to the reading out has effects on only the vertical direction. Therefore, in the second embodiment, as for the horizontal direction, the switching control of readings out of CCD is not performed. Specifically, since $$H_0 = Int(H_0) + Dec(H_0) \qquad (6)$$

holds, positions of interpolated pixels in the horizontal direction are determined to be intermediate between two adjacent pixels in the horizontal direction in accordance with the value of Dec($H_0$). Specifically, if [Dec($H_0$)] is an integer which does not exceed Dec($H_0$), an interpolated pixel of n-th and (n+1)-th pixels is set at the position which is proportionally distributed in accordance with the ratio:

$$K_H : (1-K_H)$$

where $K_H$ is defined as $K_H = [Dec(H_0)]$.

Returning to the flowchart of FIG. 17, in step S404, pixel shifting ratio data $K_V$ and $K_H$ are determined based on the decimal fraction part of the target position coordinate data expressed by the above-described number of pixels. In practice, pixel-shifting data $K_V$ and $K_H$ may be set to any value from 0 to 1. It is so set that pixel-shifting data $K_V$ or $K_H$ is 1 when the decimal fraction part is 0.

In the next step S405 which is the process characteristic to the present invention and the details are set forth above. The correction variable data is regenerated so as to achieve constant resolution on the screen. In step S406, the target position coordinates ($V_0$, $H_0$) calculated in step S403 are outputted as a command to the CCD driver 106 and the enlargement/interpolation/pixel shifting circuit 105 as the position to be extracted. In addition, the setting of color process of the camera signal processor 104 is changed in accordance with the setting of the extraction position (the camera signal processor 104, enlargement/interpolation/pixel shifting circuit 105, and CCD driver 106 operate such that the extraction position is outputted as commanded in the next field). Then, the process returns to step S401 for processing the next field until integration is performed ten times.

Meanwhile, in the foregoing step S402, if the switch 112 is OFF, i.e., anti-vibration function is not activated, the value for pixel shifting is set to 1 in step S407 (not performing pixel shifting), and a command for extracting the center of the screen and a pixel shifting value set in the foregoing step S407 are respectively outputted in step S408.

Why the distribution ratio according to the second embodiment is set to 7:1 or 1:7 will be explained below.

As illustrated in FIGS. 19 and 20, the second embodiment interpolates two pixels between two adjacent pixels so that the resolving power may be doubled. The second embodiment necessitates to generate the interpolated pixels so that they may have equally spaced. In order to achieve the double resolving power as well as the equal intervals, an interval between one pixel which is normally transferred (like pixel 502) and one pixel which is shifted by one-pixel distance (like pixel 506) have to be divided into divisional ratio 1:2:1. In other words, the interval between two pixels which are displaced from each other by one pixel distance must be divided into four subintervals. In this connection, the a pair of two pixels (for instance, the pixels 502 and 506) cannot be read out simultaneously, as shown in FIG. 8. For this reason, the second embodiment divides into eight (8) sub-intervals, an interval between two pixels which are spaced by two pixel distance (pairs of pixels each of which are two pixels from the normal image signal, such as pixels 502 and 503, or pairs of pixels each of which are two pixels from one-pixel-distance-shifted pixel, such as pixels 506 and 507), and then proportionally divides the interval with ratio 1/8:7/8.

As has been described above, according to the image sensing method and apparatus of the second embodiment, pixel shifting operation is performed in combination with the operation of changing the pixel area normally transferred at one pixel pitch in anti-vibration operation. Each of these operations is controlled appropriately so as to use a predetermined correction position only. This attains the effects of securing a resolution necessary for anti-vibration, keeping the resolution constant on a screen, highly effective anti-vibration, and a stable screen image.

The present invention is not limited to the above embodiments and various changes and modifications can be made within the spirit and scope of the present invention. Therefore, to appraise the public of the scope of the present invention, the following claims are made.

What is claimed is:

1. An image sensing method comprising:
   a vibration detecting step of detecting vibration of an image sensing apparatus main body;
   a calculating step of calculating a correction variable based on vibration data indicative of the vibration of the image sensing apparatus main body detected in said vibration detecting step;
   a control step of controlling a timing of reading an image signal from an image sensing device based on a calculating result of said calculating step;
   an adding step of adding first pixel data in the read image signal to second pixel data neighboring said first pixel data in accordance with a predetermined addition ratio which is determined based on the calculating result of said calculating step, to obtain an interpolated pixel data for an arbitrary position between the neighboring first and second pixel position;
   an addition control step of activating said adding step in a moving image recording mode and of inactivating said adding step in a still image recording mode.

2. An image sensing method comprising:
   a vibration detecting step of detecting vibration of an image sensing apparatus main body;
   a calculating step of calculating a correction variable based on vibration data indicative of the vibration of the image sensing apparatus main body detected in said vibration detecting step;
   a control step of controlling a timing of reading an image signal from an image sensing device based on a calculating result of said calculating step;
   an adding step of, in a moving image recording mode, adding first pixel data in the read image signal to second pixel data neighboring said first pixel data in accordance with a predetermined addition ratio which is determined based on the calculating result of said calculating step, to obtain an interpolated pixel data for an arbitrary position between the neighboring first and second pixel position, and, in a still image recording mode, adding first pixel data in the read image signal to second pixel data neighboring said first pixel data in accordance with a fixed addition ratio 1:0.

3. An image sensing apparatus comprising:
   vibration detecting means for detecting vibration of an image sensing apparatus main body;
   calculating means for calculating a correction variable based on vibration data indicative of the vibration of the image sensing apparatus main body detected in said vibration detecting step;
   control means for controlling a timing of reading an image signal from an image sensing device based on a calculating result of said calculating means;
   adding means for adding first pixel data in the read image signal to second pixel data neighboring said first pixel data in accordance with a predetermined addition ratio which is determined based on the calculating result of said calculating means, to obtain an interpolated pixel data for an arbitrary position between the neighboring first and second pixel position;
   an addition control means for activating said adding step in a moving image recording mode and of inactivating said adding means in a still image recording mode.

4. An image sensing apparatus comprising:
   a vibration detecting means for detecting vibration of an image sensing apparatus main body;
   a calculating means for calculating a correction variable based on vibration data indicative of the vibration of the image sensing apparatus main body detected in said vibration detecting means;
   a control means for controlling a timing of reading an image signal from an image sensing device based on a calculating result of said calculating means;
   an adding means for, in a moving image recording mode, adding first pixel data in the read image signal to second pixel data neighboring said first pixel data in accordance with a predetermined addition ratio which is determined based on the calculating result of said calculating means, to obtain an interpolated pixel data for an arbitrary position between the neighboring first and second pixel position, and, in a still image recording mode, adding first pixel data in the read image signal to second pixel data neighboring said first pixel data in accordance with a fixed addition ratio 1:0.

5. A recording medium storing a control program for controlling an image sensing apparatus, said control program having control modules comprising the steps of:
   detecting vibration of an image sensing apparatus main body;
   calculating a correction variable based on vibration data indicative of the detected vibration of the image sensing apparatus main body;
   controlling a timing of reading an image signal from an image sensing device based on a calculation result;
   adding first pixel data in the read image signal to second pixel data neighboring said first pixel data in accordance with a predetermined addition ratio based on the calculation result, to obtain an interpolated pixel data for an arbitrary position between the neighboring first and second pixel data;
   activating a moving image recording mode and inactivating a still image recording mode.

6. A recording medium storing a control program for controlling an image sensing apparatus, said control program having control modules comprising the steps of:
   detecting vibration of an image sensing apparatus main body;
   calculating a correction variable based on vibration data indicative of the detected vibration of the image sensing apparatus main body;
   controlling a timing of reading an image signal from an image sensing device based on a calculating result; in a moving image recording mode, adding first pixel data in the read image signal to second pixel data neighboring said first pixel data in accordance with a predetermined addition ratio based on the calculation result, to obtain an interpolated pixel data for an arbitrary position between the neighboring first and second pixel position, and, in a still image recording mode, adding first pixel data in the read image signal to second pixel data neighboring said first pixel data in accordance with a fixed addition ratio 1:0.

7. An image sensing method comprising:
a vibration detecting step of detecting vibration of an image sensing apparatus main body;
a calculating step of calculating a correction variable based on vibration data indicative of the vibration of the image sensing apparatus main body detected in said vibration detecting step;
a control step of controlling a timing of reading an image signal from an image sensing device based on a calculating result of said calculating step;
an adding step of adding first pixel data in the read image signal to second pixel data neighboring said first pixel data in accordance with a predetermined addition ratio which is determined based on the calculating result of said calculating step, to obtain an interpolated pixel data for an arbitrary position between the neighboring first and second pixel position;
an addition control step of activating said adding step when a moving image is recorded and of inactivating said adding step when a still image is recorded.

8. An image sensing method comprising:
a vibration detecting step of detecting vibration of an image sensing apparatus main body;
a calculating step of calculating a correction variable based on vibration data indicative of the vibration of the image sensing apparatus main body detected in said vibration detecting step;
a control step of controlling a timing of reading an image signal from an image sensing device based on a calculating result of said calculating step;
an adding step of, when a moving image is recorded, adding first pixel data in the read image signal to second pixel data neighboring said first pixel data in accordance with a predetermined addition ratio which is determined based on the calculating result of said calculating step, to obtain an interpolated pixel data for an arbitrary position between the neighboring first and second pixel position, and, when a still image is recorded, adding first pixel data in the read image signal to second pixel data neighboring said first pixel data in accordance with a fixed addition ratio 1:0.

9. An image sensing apparatus comprising:
vibration detecting means for detecting vibration of an image sensing apparatus main body;
calculating means for calculating a correction variable based on vibration data indicative of the vibration of the image sensing apparatus main body detected in said vibration detecting means;
control means for controlling a timing of reading an image signal from an image sensing device based on a calculating result of said calculating means;
adding means for adding first pixel data in the read image signal to second pixel data neighboring said first pixel data in accordance with a predetermined addition ratio which is determined based on the calculating result of said calculating means, to obtain an interpolated pixel data for an arbitrary position between the neighboring first and second pixel position;

an addition control means for activating said adding step when a moving image is recorded and of inactivating said adding means when a still image is recorded.

10. An image sensing apparatus comprising:
a vibration detecting means for detecting vibration of an image sensing apparatus main body;
a calculating means for calculating a correction variable based on vibration data indicative of the vibration of the image sensing apparatus main body detected in said vibration detecting means;
a control means for controlling a timing of reading an image signal from an image sensing device based on a calculating result of said calculating means;
an adding means for, when a moving image is recorded, adding first pixel data in the read image signal to second pixel data neighboring said first pixel data in accordance with a predetermined addition ratio which is determined based on the calculating result of said calculating means, to obtain an interpolated pixel data for an arbitrary position between the neighboring first and second pixel position, and, when a still image is recorded, adding first pixel data in the read image signal to second pixel data neighboring said first pixel data in accordance with a fixed addition ratio 1:0.

11. A recording medium storing a control program for controlling an image sensing apparatus, said control program having control modules comprising the steps of:
detecting vibration of an image sensing apparatus main body;
calculating a correction variable based on vibration data indicative of the detected vibration of the image sensing apparatus main body;
controlling a timing of reading an image signal from an image sensing device based on a calculation result;
adding first pixel data in the read image signal to second pixel data neighboring said first pixel data in accordance with a predetermined addition ratio based on the calculation result, to obtain an interpolated pixel data for an arbitrary position between the neighboring first and second pixel data;
starting recording of a moving image.

12. A recording medium storing a control program for controlling an image sensing apparatus, said control program having control modules comprising the steps of:
detecting vibration of an image sensing apparatus main body;
calculating a correction variable based on vibration data indicative of the detected vibration of the image sensing apparatus main body;
controlling a timing of reading an image signal from an image sensing device based on a calculating result;
when a moving image is recorded, adding first pixel data in the read image signal to second pixel data neighboring said first pixel data in accordance with a predetermined addition ratio based on the calculation result, to obtain an interpolated pixel data for an arbitrary position between the neighboring first and second pixel position, and, when a still image is recorded, adding first pixel data in the read image signal to second pixel data neighboring said first pixel data in accordance with a fixed addition ratio 1:0.

* * * * *